United States Patent
Seregin et al.

(10) Patent No.: US 11,368,684 B2
(45) Date of Patent: Jun. 21, 2022

(54) ADAPTATION PARAMETER SETS (APS) FOR ADAPTIVE LOOP FILTER (ALF) PARAMETERS

(71) Applicant: QUALCOMM Incorporated, San Diego, CA (US)

(72) Inventors: Vadim Seregin, San Diego, CA (US); Nan Hu, San Diego, CA (US); Muhammed Zeyd Coban, Carlsbad, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/842,343

(22) Filed: Apr. 7, 2020

(65) Prior Publication Data
US 2020/0344473 A1   Oct. 29, 2020

Related U.S. Application Data

(60) Provisional application No. 62/865,890, filed on Jun. 24, 2019, provisional application No. 62/837,711, filed on Apr. 23, 2019.

(51) Int. Cl.
H04N 19/117 (2014.01)
H04N 19/70 (2014.01)
H04N 19/169 (2014.01)

(52) U.S. Cl.
CPC ......... *H04N 19/117* (2014.11); *H04N 19/188* (2014.11); *H04N 19/70* (2014.11)

(58) Field of Classification Search
CPC .... H04N 19/117; H04N 19/188; H04N 19/70; H04N 19/174; H04N 19/186; H04N 19/463
See application file for complete search history.

(56) References Cited

U.S. PATENT DOCUMENTS

2013/0101018 A1* 4/2013 Chong ............... H04N 19/82
  375/E7.026
2013/0114694 A1* 5/2013 Chen ................. H04N 19/70
  375/240.03

(Continued)

FOREIGN PATENT DOCUMENTS

GB   2501125 A  * 10/2013 ............ H04N 19/61
WO   2013070703 A1   5/2013

(Continued)

OTHER PUBLICATIONS

Bross B., et al., "Versatile Video Coding (Draft 5)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N1001, Apr. 12, 2019 (Apr. 12, 2019), XP030205171, 360 pages, Retrieved from the Internet: URL: http://phenix.int-evry.fr/jvet/doc_end_user/documents/14_Geneva/wg11/JVET-N1001-v2.zip JVET-N1001-v2.docx. [retrieved on Apr. 12, 2019] paragraph [7.3.2.5] paragraph [7.3.5.3] paragraph [7.4.3.5] paragraph [7.4.6.3].

(Continued)

Primary Examiner — Robert J Hance
(74) Attorney, Agent, or Firm — Polsinelli

(57) ABSTRACT

Techniques are described for adaptation parameter sets (APS) for adaptive loop filter (ALF) parameters. One example involves obtaining an APS ID value and an APS type value associated with a NAL unit from a bitstream. A first APS associated with at least a portion of at least one picture is identified, with the first APS being uniquely identified by a combination of the APS type value and the APS identifier value, and the APS identifier value of the first APS is in a range based on the APS type value. The portion of the at least one picture is then reconstructed using an adaptive loop filter with parameters defined by the first APS uniquely identified by the APS type value and the APS identifier value.

42 Claims, 8 Drawing Sheets

(56) References Cited

U.S. PATENT DOCUMENTS

| | | | |
|---|---|---|---|
| 2020/0296365 A1* | 9/2020 | Chen | H04N 19/70 |
| 2020/0344473 A1* | 10/2020 | Seregin | H04N 19/70 |
| 2021/0314628 A1* | 10/2021 | Zhang | H04N 19/96 |
| 2021/0368171 A1* | 11/2021 | Zhang | H04N 19/176 |

FOREIGN PATENT DOCUMENTS

| | | | | |
|---|---|---|---|---|
| WO | WO-2020126411 A1 * | 6/2020 | | H04N 19/117 |
| WO | WO-2020176635 A1 * | 9/2020 | | H04N 19/105 |
| WO | WO-2020180122 A1 * | 9/2020 | | |

OTHER PUBLICATIONS

Hannuksela (Nokia) M.M., "AHG9 High-Level Syntax: APS Loss Detection", 10. JCT-VC Meeting, 101, MPEG Meeting, Jul. 11, 2012-Jul. 20, 2012, Stockholm, (The Joint Collaborative Team on Video Coding of ISO/IEC JTC1/SC29/WG11 and ITU-T SG.16), URL: http://wftp3.itu.int/av-arch/jctvc-site/. No. JCTVC-J0072. Jun. 29, 2012 (Jun. 29, 2012), XP030112434, 4 pages, sections 2. 3.

International Search Report and Written Opinion—PCT/US2020/027215—ISA/EPO—dated Jun. 24, 2020.

Seregin (Qualcomm) V., et al., "AHG17: Separate Luma and Chroma ALF APS Types", 15. JVET Meeting, Jul. 3, 2019-Jul. 12, 2019, Gothenburg, (The Joint Video Exploration Team of ISO/IEC JTC1/SC29/WG11 and ITU-T SG.16 ), No. JVET-O0246, Jun. 26, 2019 (Jun. 26, 2019), XP030218952, 4 pages, Retrieved from the Internet: URL: http://phenix.int-evry.fr/jvet/doc_end_user/documents/15_Gothenburg/wg11/JVET-O0246-v1.zip JVET-O0246.docx. [retrieved on Jun. 26, 2019] the whole document.

Tanaka, et al., "Non-CE4 Subtest3 : Extension of Adaptation Parameter Sets syntax for Quantization matrix," JCTVC-G295, Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-7.

Y-K Wang (Huawei)., et al., "AHG17 /AHG16: Signalling of Reshaper Parameters in APS", 126. MPEG Meeting, Mar. 25, 2019-Mar. 29, 2019, Geneva, (Motion Picture Expert Group or ISO/IEC JTC1/SC29/WG11), No. m46773, Mar. 12, 2019 (Mar. 12, 2019), XP030209277, 8 pages, Retrieved from the Internet: URL: http://phenix.int-evry.fr/mpeg/doc_end_user/documents/126_Geneva/wg11/m46773-JVE T-N0117-v1-JVET-N0117-v1.zip JVET-N0117-v1.docx. [retrieved on Mar. 12, 2019] section 3.

* cited by examiner

500

OBTAIN, FROM A BITSTREAM, AN ADAPTATION PARAMETER SET IDENTIFIER VALUE ASSOCIATED WITH AN ADAPTATION PARAMETER SET NETWORK ABSTRACTION LAYER UNIT
502

OBTAIN, FROM THE BITSTREAM, AN ADAPTATION PARAMETER SET TYPE VALUE ASSOCIATED WITH THE ADAPTATION PARAMETER SET NETWORK ABSTRACTION LAYER UNIT
504

IDENTIFY A FIRST ADAPTATION PARAMETER SET ASSOCIATED WITH AT LEAST A PORTION OF AT LEAST ONE PICTURE, THE FIRST ADAPTATION PARAMETER SET BEING UNIQUELY IDENTIFIED BY A COMBINATION OF THE ADAPTATION PARAMETER SET TYPE VALUE AND THE ADAPTATION PARAMETER SET IDENTIFIER VALUE, WHEREIN THE ADAPTATION PARAMETER SET IDENTIFIER VALUE OF THE FIRST ADAPTATION PARAMETER SET IS IN A RANGE BASED ON THE ADAPTATION PARAMETER SET TYPE VALUE
506

RECONSTRUCT THE PORTION OF THE AT LEAST ONE PICTURE USING AN ADAPTIVE LOOP FILTER WITH PARAMETERS DEFINED BY THE FIRST ADAPTATION PARAMETER SET UNIQUELY IDENTIFIED BY THE ADAPTATION PARAMETER SET TYPE VALUE AND THE ADAPTATION PARAMETER SET IDENTIFIER VALUE
508

ADAPTATION PARAMETER SETS (APS) FOR ADAPTIVE LOOP FILTER (ALF) PARAMETERS

CROSS-REFERENCES TO RELATED APPLICATIONS

This application claims the benefit of U.S. Provisional Application No. 62/837,711, filed Apr. 23, 2019, and U.S. Provisional Application No. 62/865,890, filed Jun. 24, 2019, which are both hereby incorporated by reference, in their entirety and for all purposes.

FIELD

This application is related to video coding. For example, this application relates to systems, methods, and computer-readable media for providing adaptation parameter sets (APS) for adaptive loop filter (ALF) parameters.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), moving picture experts group (MPEG) coding, among others. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

Systems and methods are described herein for improved video processing. Digital video data includes large amounts of data to meet the demands of consumers and video providers, which places a burden on communication networks and devices that process and store the video data. Some examples of video processing use adaptation parameter sets (APS) for video coding to inform encoding and decoding devices of parameters used to process parts of pictures. APS signaling in a bitstream and storage in memory imposes resource costs on a video processing system, where efficient resource usage is valued given the burden on networks and devices. Examples described herein improve the performance of video processing networks and devices with APS structures that allow improved signaling efficiency, processing efficiency, and memory usage efficiency.

In some examples, an APS is uniquely identified by a combination of an APS type value and an APS identifier value, which can allow buffer memory to be allocated based on APS type. Since different APS types can have different numbers of parameters (e.g. with different memory usage), an APS type value can be used to match the memory allocation of buffers exactly to the APS, avoiding wasted memory space that can occur if the APS type is not identified and a shared buffer is used for all APS types. In other examples, different APS types can have a different number of maximum identifier values (e.g. different identifier spaces). If each APS type in a system has a different maximum identifier value, an APS type can be identified from a maximum identifier value, which can improve the efficiency of a device determining an APS type. In various examples, different maximum identifier values can also be used to improve signaling efficiency by matching signaling to the maximum identifier value, rather than having all APS types use the same signaling.

In some examples, flags can be provided that indicate the use of luma and chroma filters which can be signaled independently. In some examples, independent signaling of the presence of luma filters and chroma filters improves the operation of devices by improving the efficiency of parsing operations. In some examples, independent flag signaling can also allow luma and chroma flags that indicate whether the luma or chroma filters are to be used rather than whether parameters are present. In some examples, independent flag signaling can allow signaling of parameters for future use by a later picture when the parameters are not to be used with a current picture.

Additional improvements are described in the context of the examples presented herein.

According to at least one example, an apparatus for decoding video data is provided. The apparatus includes a memory and a processor implemented in circuitry. The processor is configured to: obtain, from a bitstream, an adaptation parameter set identifier value associated with an adaptation parameter set network abstraction layer unit; obtain, from the bitstream, an adaptation parameter set type value associated with the adaptation parameter set network abstraction layer unit; identify a first adaptation parameter set associated with at least a portion of at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and reconstruct the portion of the at least one picture using an adaptive loop filter with parameters defined by the first adaptation parameter set uniquely identified by the adaptation parameter set type value and the adaptation parameter set identifier value.

In another example, a method of decoding video data is provided. The method includes: obtaining, from a bitstream, an adaptation parameter set identifier value associated with an adaptation parameter set network abstraction layer unit; obtaining, from the bitstream, an adaptation parameter set type value associated with the adaptation parameter set network abstraction layer unit; identifying a first adaptation parameter set associated with at least a portion of at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and reconstructing the portion of the at least one picture using an adaptive loop filter with parameters defined by the first adaptation parameter set uniquely identified by the adaptation parameter set type value and the adaptation parameter set identifier value.

In another example, a non-transitory computer-readable medium for coding video data is provided. The non-transitory computer-readable medium can include instructions stored thereon that, when executed by one or more processors, cause the one or more processors to: obtain, from a bitstream, an adaptation parameter set identifier value associated with an adaptation parameter set network abstraction layer unit; obtain, from the bitstream, an adaptation parameter set type value associated with the adaptation parameter set network abstraction layer unit; identify a first adaptation parameter set associated with at least a portion of at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and reconstruct the portion of the at least one picture using an adaptive loop filter with parameters defined by the first adaptation parameter set uniquely identified by the adaptation parameter set type value and the adaptation parameter set identifier value.

In another example, an apparatus for decoding video data is provided. The apparatus includes: means for obtaining, from a bitstream, an adaptation parameter set identifier value associated with an adaptation parameter set network abstraction layer unit; means for obtaining, from the bitstream, an adaptation parameter set type value associated with the adaptation parameter set network abstraction layer unit; means for identifying a first adaptation parameter set associated with at least a portion of at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and means for reconstructing the portion of the at least one picture using an adaptive loop filter with parameters defined by the first adaptation parameter set uniquely identified by the adaptation parameter set type value and the adaptation parameter set identifier value.

In some aspects, a maximum number of adaptation parameter set identifiers that can use a particular adaptation parameter set type is defined by the adaptation parameter set type value.

In some aspects, a first adaptation parameter set type of a plurality of adaptation parameter set types is associated with a first number of identifier values, and wherein a second adaptation parameter set type of the plurality of adaptation parameter set types is associated with a second number of identifier values, the second number of identifier values being different than the first number of identifier values. In some aspects, the maximum number of adaptation parameter set identifiers is a same value for each adaptation parameter set type. In some aspects, a different number of bits are used for different types of adaptation parameter set identifiers.

In some aspects, the methods, apparatuses, and computer-readable media described above can include: determining a second adaptation parameter set identifier value associated with a second adaptation parameter set network abstraction layer unit of the video bitstream; determining a second adaptation parameter set type value associated with the second adaptation parameter set network abstraction layer unit of the video bitstream; identifying a second adaptation parameter set associated with at least a second portion of the at least one picture, the second adaptation parameter set being uniquely identified by the second adaptation parameter set type value and the second adaptation parameter set identifier value, wherein the adaptation parameter set identifier value range of the second adaptation parameter set is based on the second adaptation parameter set type value; and reconstructing at least the second portion of the at least one picture of the video bitstream using the adaptive loop filter with parameters defined by the second adaptation parameter set uniquely identified by the second adaptation parameter set type value and the second adaptation parameter set identifier value.

In some aspects, the adaptation parameter set identifier value for the second adaptation parameter set and the adaptation parameter set identifier value for the first adaptation parameter set are a same value. In some cases, the first adaptation parameter set type value is an adaptive loop filter luma type, and the second adaptation parameter set type value is an adaptive loop filter chroma type.

In some aspects, the methods, apparatuses, and computer-readable media described above can include identifying at least one flag associated with the first adaptation parameter set. The at least one flag includes at least one or more of a first flag indicating luma filter data is included in the first adaptation parameter set or a second flag indicating chroma filter data is included in the first adaptation parameter set. In some cases, a value of the first flag and a value of the second flag are set independently.

In some aspects, the methods, apparatuses, and computer-readable media described above can include: configuring a first adaptation parameter set buffer for a first adaptation parameter set type; and configuring a second adaptation parameter set buffer for a second adaptation parameter set type.

In some aspects, the methods, apparatuses, and computer-readable media described above can include: storing received bits of the first adaptation parameter set having the first adaptation parameter set type in the first adaptation parameter set buffer; and storing received bits of a second adaptation parameter set having the second adaptation parameter set type in the second adaptation parameter set buffer.

In some aspects, the methods, apparatuses, and computer-readable media described above can include configuring a first buffer for a first adaptation parameter set type of a plurality of adaptation parameter set types. The first buffer has a first identifier set range smaller than a maximum identifier value. In some aspects, the methods, apparatuses, and computer-readable media described above can include configuring a second buffer for a second adaptation parameter set type of the plurality of adaptation parameter set types. The second buffer has a second identifier set range smaller than the maximum identifier value. The second identifier set range is different than the first identifier set range.

In some aspects, the methods, apparatuses, and computer-readable media described above can include interpreting the adaptation parameter set identifier value using the adaptation parameter set type value.

In some aspects, the first adaptation parameter set is uniquely identified by a combination of the adaptation parameter set type value and the adaptation parameter set identifier value as represented by a series of consecutive bits in the bitstream. In some examples, a first portion of bits in the series of consecutive bits in the bitstream represents the adaptation parameter set type value and a second portion of bits in the series of consecutive bits in the bitstream represents the adaptation parameter set type identifier values. In some examples, a first portion of bits in the series of consecutive bits in the bitstream represents the adaptation parameter set type identifier value, and a second portion of bits following the first portion of bits in the bitstream represents the adaptation parameter set type value.

In some aspects, the first adaptation parameter set includes luma filter coefficients and chroma filter coefficients. The luma filter coefficients are associated with a second adaptation parameter set type value, and the chroma filter coefficients are associated with a third adaptation parameter set type value different than the second adaptation parameter set type value. In some cases, the luma filter coefficients are associated with a luma filter signaled flag, and the chroma filter coefficients are associated with a chroma filter signaled flag different than and operates independently from the luma filter signaled flag.

According to at least one other example, an apparatus for encoding video data is provided. The apparatus includes a memory and a processor implemented in circuitry. The apparatus is configured to: determine an adaptation parameter set identifier value associated with an adaptation parameter set network abstraction layer unit; determine an adaptation parameter set type value associated with the adaptation parameter set network abstraction layer unit; identify a first adaptation parameter set associated with a portion of the at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and generate a bitstream, the bitstream including the adaptation parameter set identifier value, the adaptation parameter set type value, and the portion of the at least one picture as encoded.

In another example, a method of encoding video data is provided. The method includes: determining an adaptation parameter set identifier value associated with an adaptation parameter set network abstraction layer unit; determining an adaptation parameter set type value associated with the adaptation parameter set network abstraction layer unit; identifying a first adaptation parameter set associated with a portion of the at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and generating a bitstream, the bitstream including the adaptation parameter set identifier value, the adaptation parameter set type value, and the portion of the at least one picture as encoded.

In other example, a non-transitory computer-readable medium for coding video data is provided. The non-transitory computer-readable medium can include instructions stored thereon that, when executed by one or more processors, cause the one or more processors to: determine an adaptation parameter set identifier value associated with an adaptation parameter set network abstraction layer unit; determine an adaptation parameter set type value associated with the adaptation parameter set network abstraction layer unit; identify a first adaptation parameter set associated with a portion of the at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and generate a bitstream, the bitstream including the adaptation parameter set identifier value, the adaptation parameter set type value, and the portion of the at least one picture as encoded.

In another example, an apparatus for encoding video data is provided. The apparatus includes: means for determining an adaptation parameter set identifier value associated with an adaptation parameter set network abstraction layer unit; means for determining an adaptation parameter set type value associated with the adaptation parameter set network abstraction layer unit; means for identifying a first adaptation parameter set associated with a portion of the at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and means for generating a bitstream, the bitstream including the adaptation parameter set identifier value, the adaptation parameter set type value, and the portion of the at least one picture as encoded.

In some aspects, a maximum number of adaptation parameter set identifiers that can use a particular adaptation parameter set type is defined by the adaptation parameter set type value.

In some aspects, a first adaptation parameter set type of a plurality of adaptation parameter set types is associated with a first number of identifier values, and wherein a second adaptation parameter set type of the plurality of adaptation parameter set types is associated with a second number of identifier values, the second number of identifier values being different than the first number of identifier values. In some aspects, the maximum number of adaptation parameter set identifiers is a same value for each adaptation parameter set type. In some aspects, a different number of bits are used for different types of adaptation parameter set identifiers.

In some aspects, the methods, apparatuses, and computer-readable media described above can include: determining a second adaptation parameter set identifier value associated with a second adaptation parameter set network abstraction layer unit of the video bitstream; determining a second adaptation parameter set type value associated with the second adaptation parameter set network abstraction layer unit of the video bitstream; identifying a second adaptation parameter set associated with at least a second portion of the at least one picture, the second adaptation parameter set being uniquely identified by the second adaptation parameter set type value and the second adaptation parameter set identifier value, wherein the adaptation parameter set identifier value range of the second adaptation parameter set is based on the second adaptation parameter set type value; and including in the bitstream, parameters of the adaptive loop filter defined by the second adaptation parameter set uniquely identified by the second adaptation parameter set type value and the second adaptation parameter set identifier value. At least the second portion of the at least one picture can be reconstructed (e.g., by an encoding device and/or a decoding device) using the adaptive loop filter with the parameters defined by the second adaptation parameter set uniquely identified by the second adaptation parameter set type value and the second adaptation parameter set identifier value.

In some aspects, the adaptation parameter set identifier value for the second adaptation parameter set and the adaptation parameter set identifier value for the first adaptation parameter set are a same value. In some cases, the first adaptation parameter set type value is an adaptive loop filter luma type, and the second adaptation parameter set type value is an adaptive loop filter chroma type.

In some aspects, the methods, apparatuses, and computer-readable media described above can include setting a value for at least one flag associated with the first adaptation parameter set. The at least one flag includes at least one or more of a first flag indicating luma filter data is included in the first adaptation parameter set or a second flag indicating chroma filter data is included in the first adaptation parameter set. In some cases, a value of the first flag and a value of the second flag are set independently.

In some aspects, the first adaptation parameter set is uniquely identified by a combination of the adaptation parameter set type value and the adaptation parameter set identifier value as represented by a series of consecutive bits in the bitstream. In some examples, a first portion of bits in the series of consecutive bits in the bitstream represents the adaptation parameter set type value and a second portion of bits in the series of consecutive bits in the bitstream represents the adaptation parameter set type identifier values. In some examples, a first portion of bits in the series of consecutive bits in the bitstream represents the adaptation parameter set type identifier value, and a second portion of bits following the first portion of bits in the bitstream represents the adaptation parameter set type value.

In some aspects, the first adaptation parameter set includes luma filter coefficients and chroma filter coefficients. The luma filter coefficients are associated with a second adaptation parameter set type value, and the chroma filter coefficients are associated with a third adaptation parameter set type value different than the second adaptation parameter set type value. In some cases, the luma filter coefficients are associated with a luma filter signaled flag, and the chroma filter coefficients are associated with a chroma filter signaled flag different than and operates independently from the luma filter signaled flag.

In some aspects, the apparatus comprises a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a television, a server computer, or other device. In some aspects, the apparatus includes a camera or multiple cameras for capturing one or more images. In some aspects, the apparatus includes a display for displaying one or more images (e.g., one or more reconstructed pictures), notifications, and/or other displayable data. For example, the apparatus can include a display configured to display the at least one picture (e.g., after the at least one picture is reconstructed). In another example, the apparatus can include a mobile device with a display configured to display the at least one picture (e.g., after the at least one picture is reconstructed).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures:

FIG. 5 is a flow diagram illustrating an example method in accordance with various examples described herein.

DETAILED DESCRIPTION

Figure 1:
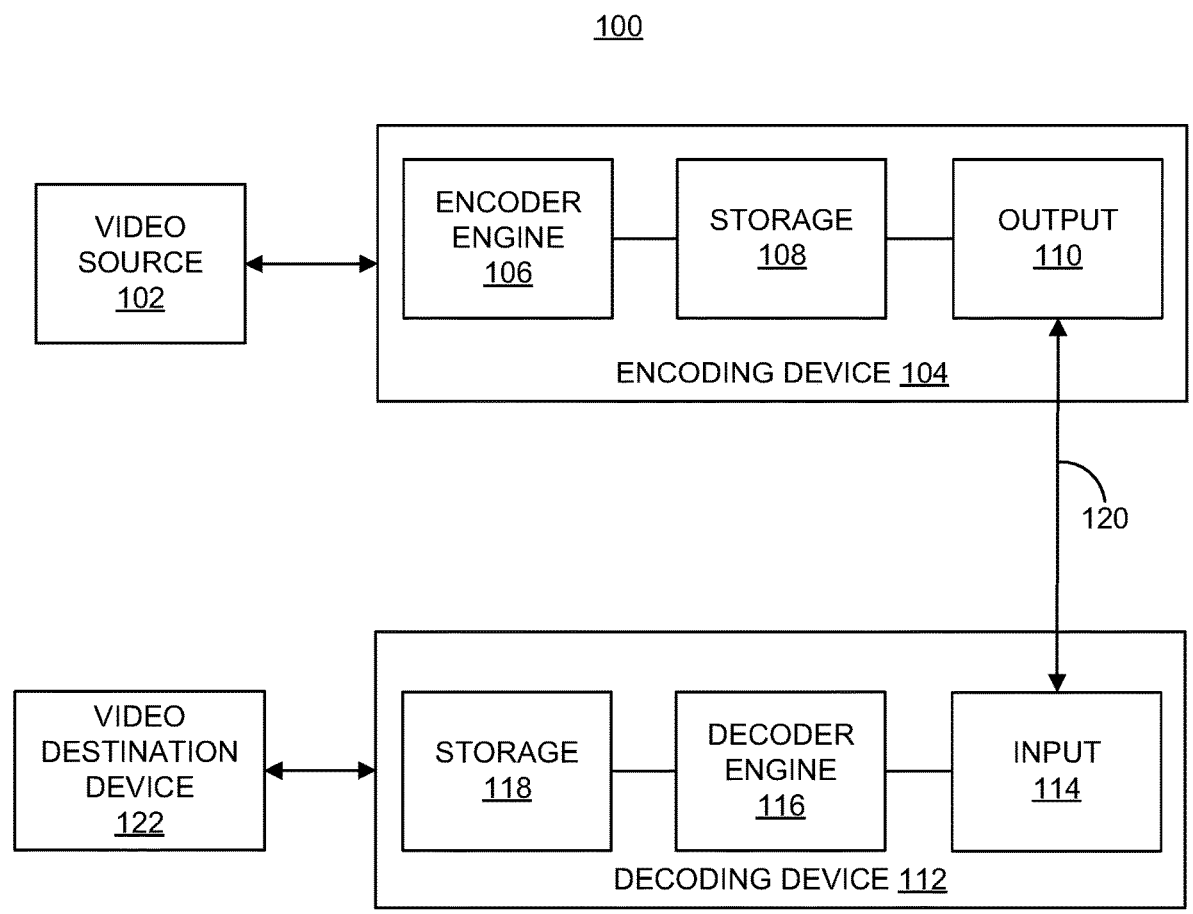
FIG. 1 is a block diagram illustrating an example of an encoding device and a decoding device, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive.

The ensuing description provides exemplary examples only, and is not intended to limit the scope, applicability, or configuration of the disclosure. Rather, the ensuing description of the exemplary examples will provide those skilled in the art with an enabling description for implementing an exemplary example. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder can restrict the search to a certain spatial displacement from the block to be encoded. In some systems, a best match is located using a two-dimensional (2D) motion vector that includes a horizontal displacement component and a vertical displacement component. For intra-prediction modes, a video encoder can form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder can also apply a transform to the prediction error (e.g., a discrete cosine transform (DCT) or other suitable transform) to generate transform coefficients. After transformation, the video encoder may quantize the transform coefficients. In some examples, the quantized transform coefficients and motion vectors are represented using syntax elements, and, along with control information, form a coded representation of a video sequence. In some instances, the video encoder may entropy code syntax elements, thereby further reducing the number of bits for their representation.

A video decoder can, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), and/or other video coding standard in development or to be developed.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and HEVC or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model). A new video coding standard being developed by JVET is called Versatile Video Coding (VVC).

HEVC was finalized by the Joint Collaboration Team on Video Coding (JCT-VC) of ITU-T Video Coding Experts Group (VCEG) and ISO/IEC Motion Picture Experts Group (MPEG) in 2013. The Joint Video Experts Team (JVET), a collaborative team formed by MPEG and ITU-T Study Group 16's VCEG is working on the new VVC video coding standard. An objective of VVC is to provide a significant improvement in compression performance over the existing HEVC standard, aiding in deployment of higher-quality video services and emerging applications (e.g., such as 360 omnidirectional immersive multimedia, high-dynamic-range (HDR) video, among others).

Many examples described herein provide examples using the JEM model, VVC, the HEVC standard, and/or extensions thereof. However, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or interpredictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMaxm, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 7. An example of specific details of the decoding device 112 is described below with reference to FIG. 8.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not used by the decoding process. For example, the information in an SE message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

Figure 2:
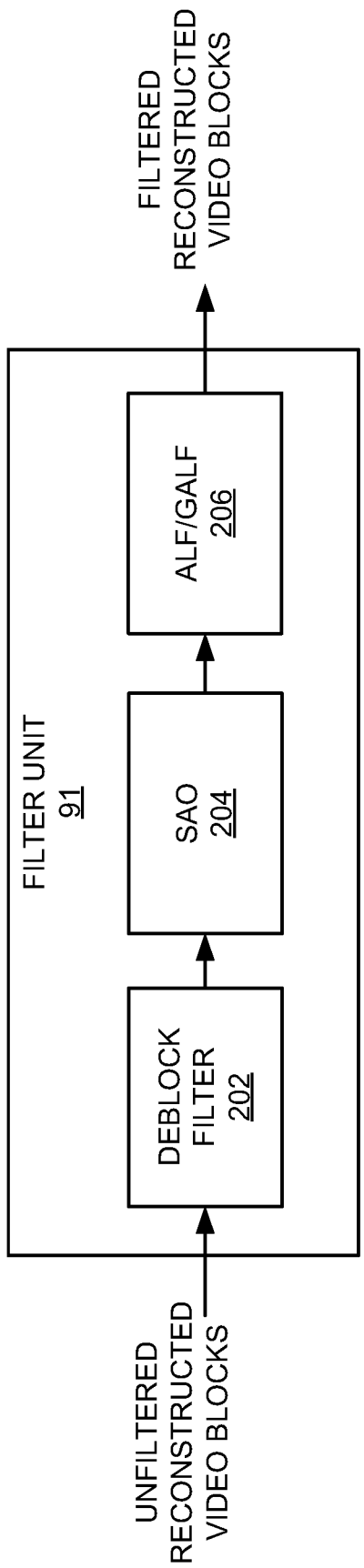
FIG. 2 is a diagram illustrating an example implementation of a filter unit for performing the techniques of this disclosure.

FIG. 2 shows an example implementation of a filter unit 91 that can be used as described below in FIG. 7 and FIG. 8. The filter unit 63 may be implemented in the same manner. The filter units 63 and 91 may perform the techniques of this disclosure, possibly in conjunction with other components of video encoding device 104 or video decoding device 112. In other examples, the filter unit 63 can be a post-processing unit that can perform the techniques of this disclosure outside of, for example, the video decoder device 112 (e.g., after the decoded video is output from the video decoder device 112). In the example of FIG. 2, filter unit 91 includes deblocking filter 202, sample adaptive offset (SAO) filter 204, and adaptive loop filter (ALF)/geometry transformation-based adaptive loop filter (GALF) filter 206. SAO filter 204 may, for example, be configured to determine offset values for samples of a block. ALF/GALF filter 206 may be configured to, for example, determine parameters for filtering a current block based on parameters for filtering a previous block that were included in the same adaptation parameter sets (APS) as the current block, a different APS, or pre-defined filters. As described below, one or more APSs can be included in the encoded video bitstream and can carry filter coefficients, among other information.

The filter unit 91 may include fewer filters and/or may include additional filters than those shown in FIG. 2. Additionally, the particular filters shown in FIG. 2 may be implemented in a different order. Other loop filters (either in the coding loop or after the coding loop) may also be used to smooth pixel transitions or otherwise improve the video quality. When in the coding loop, the decoded video blocks in a given frame or picture are then stored in a decoded picture buffer (DPB), which stores reference pictures used for subsequent motion compensation. The DPB may be part of or separate from additional memory that stores decoded video for later presentation on a display device, such as a display of video destination device 122 of FIG. 1.

As noted above, APSs can be used to carry filter coefficients in the bitstream. An APS can have an associated type, such as an ALF type or an LMCS type. An APS can contain a set of luma filter parameters or one or more sets of chroma filter parameters, or a combination thereof. A tile group (i.e., a group of one or more tiles) may only signal indices of APSs that are used for the current tile group in its tile group header. APSs can be used in various video coding standards, such as VVC. Currently there are up to eight APSs used in VVC, however, more or less may be used in the future in VVC or other video coding standards.

In some examples (e.g., in certain VVC implementations such as VVC draft 7 (JVET-P2001)), adaptive loop filters (ALF) are signaled in ALF APSs. One ALF may contain a set of luma filters and/or a set of chroma filters. Each luma filter set may have multiple filters (e.g. 10 filters, 20 filters, up to 25 filters, etc.) Each chroma filter set may have multiple filters as well (e.g. 10 filters, up to 8 filters, 15 filters, etc.) A luma coding tree block may reference an ALF APS and may use the luma filter set. A chroma coding tree block may reference an ALF APS and may use one chroma filter in the chroma filter set.

Figure 3:
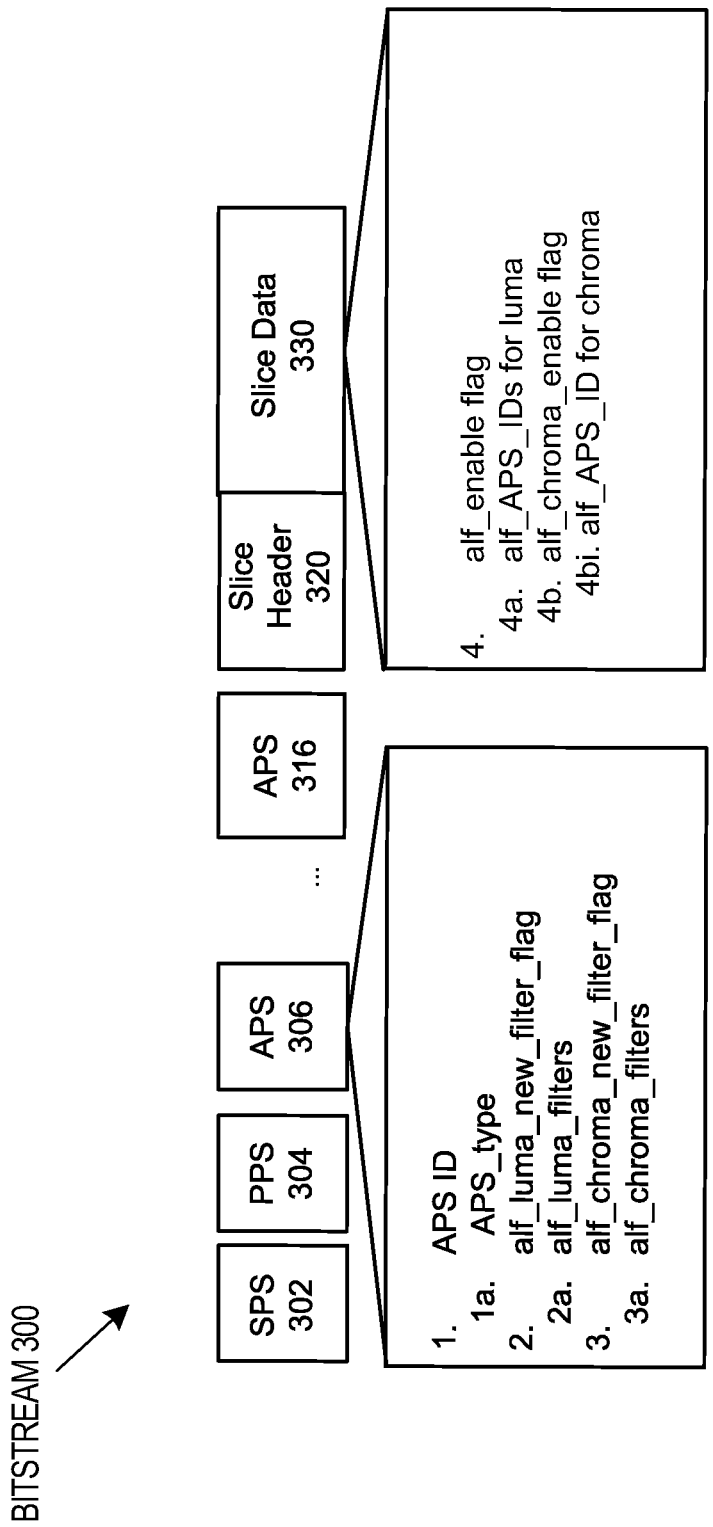
FIG. 3 is a diagram illustrating different examples of parameters that may be transmitted in a bitstream by a video encoder and received by a video decoder in accordance with some examples.

FIG. 3 illustrates a bitstream 300, and shows different examples of parameters that may be transmitted in the bitstream 300. In one example, the parameters can be transmitted by the video encoder device 104 and received by the video decoder device 112. As described herein, the bitstream includes not only these parameters as part of APSs, but also picture data (e.g. video data or image data) and other data. Bitstream 300 includes SPS 302, PPS 304, APS 306, APS 316, slice header 320, and slice data 330. A picture of the bitstream 300 can also include a picture header that includes information relating to the picture. Details of these elements are described above.

In such a bitstream 300, each APS is associated with an APS NAL unit. The APS associated with an APS NAL unit that is sent as part of the bitstream can include some or all the following as illustrated by APS 306 of FIG. 3: (1) an APS Identification value (ID), (2) any APS type value, (3) type data (e.g., alf_luma_data( ), alf_chroma_data( ), or any other such data in other examples as illustrated in the tables below), (3a) type flags for each APS type (e.g., alf_luma flag(s) and alf_chroma flag(s)). An APS ID can be present in a picture header, in a slice header of a slice of the picture, or both in the picture header and the slice header. Additional details of APS data and the associated slice header and slice data to reference the APS data are described in detail below. For example, details are described below regarding the use of APS ID and APS type values to uniquely identify a particular APS, as well as supporting structures and processes in association with this identification to improve the operation of systems and devices for encoding and decoding (e.g., using APS type specific buffers).

In addition to the above, as further illustrated by slice header 320 of FIG. 3, each APS that is sent can be referenced from an associated slice header 320. A slice header can include a slice picture parameter set ID as well as flags for various APSs. This can include type specific flags, such as the illustrated ALF enabled flags and luma and chroma sub-flags. As illustrated, for an ALF type, an (4) SPS type (e.g., ALF, LMCS, etc.) enabled flag can be parsed to identify when a (4a) slice type enabled flag is to be processed. If the slice type enabled flag is present (e.g., flagged, true, etc.), then separate flags for the associated (4)(a)(i) APS type luma ids and (4)(a)(ii) APS type chroma ids are processed, as illustrated by example. Specific details and descriptions of such flags are provided below.

The above bitstream 300 parameters can be used to implement some of the filter information signaling techniques discussed previously. As discussed above, Adaptation parameter sets (APSs) are used to signal adaptive loop filter (ALF) and Luma Mapping with Chroma Scaling (LMCS) parameters. In some examples, an APS can also be used to signal scaling matrices (e.g., as a scaling_APS syntax element). While the example below describes aspects of an ALF type APS (e.g. num_alf_luma_aps_ids), it will be apparent that such structures and associated processes can be used with any APS type. In some cases, adaptive loop filtering is used in video coding to minimize the mean square error between original samples and decoded samples by using an adaptive filter, which can be a Wiener-based adaptive filter or other suitable adaptive filter. An ALF is a loop filter. Loop filters are described below with respect to FIG. 7 and FIG. 8 in addition to throughout the specification. In some examples of existing video coding schemes, APSs are signaled as follows:

TABLE 1

| adaptation_parameter_set_rbsp( ) { | Descriptor |
|---|---|
| adaptation_parameter_set id | u(5) |
| aps_params_type | u(3) |
| if(aps_params_ type = = ALF_APS ) | |
| alf_data( ) | |
| else if( aps_params_type = = LMCS_APS) | |
| lmcs_data( ) | |
| aps_extension_flag | u(1) |
| if( aps_extension_flag ) | |
| while( more_rbsp_data( ) ) | |
| aps_extension_data_flag | u(1) |
| rbsp_trailing_bits( ) | |
| } | | with parameter types signaled as:

TABLE 2

| aps_params_type | Name of aps_params_type | Type of APS parameters |
|---|---|---|
| 0 | ALF_APS | ALF parameters |
| 1 | LMCS_APS | LMCS parameters |
| 2..7 | Reserved | Reserved |

In such examples, there is a five bit adaptation_parameter_set_id field identifying the APS, and a 3 bit aps_params_type describing the APS parameter type (e.g., whether it contains ALF related parameters, scaling matrix related parameters, or LMCS related parameters). The alf_data( ) function of table 3 below then contains the ALF parameters for both luma and chroma ALF filters. As illustrated in table 1, aps_params_type includes alf_luma_data( ) and alf_chroma( ) data with values for the different types. Thus, according to table 1, different types can be signaled in the APS parameter set. One example illustrated above includes one type for luma and one type for chroma parameters. In other examples, various different types, including multiple luma and chroma types can be present. In some examples, an APS ID is signaled for each APS type, which could be a LMCS type, ALF type, or some other type. In addition, different types can have associated IDs, so that an ALF type with an ID value of 0 is different than an LMCS type with an ID value of 0. While table 2 shows 3 aps_params_type values in a specific range or value space (e.g. 0, 1, and 2 with different corresponding names), with values 3 to 7 reserved, in various other examples, different ranges (e.g. value spaces) of values or maximum values can be used, along with additional or different types. In some examples, this APS type specific ID allows information to be uniquely identified by a combination of a type value and an ID value.

Additionally, in some examples, this APS type specific ID allows a maximum value to be associated with an APS type, and each type can have a different number of APSs. In some such examples, the maximum ID value is thus based on an APS type. An APS overhead can then be associated with an APS type value (e.g. 2 bits for a maximum ID value range from 0-3, 3 bits for a maximum ID value range from 0-7, etc.) This maximum ID value range can also be considered as a control of how many IDs can be signaled, with a code word with a limit to identify a certain range of APS sets. Thus, as described above, in some examples the maximum number of APSs is defined by type (e.g., on a type specific basis), and an APS type can then be used to identify the maximum ID value associated with an APS type is such examples.

Alf_data( ) is used above in table 1. Table 3 below illustrates aspects of the alf_data( ) function in accordance with some examples as follows:

TABLE 3

| alf_data( ) { | Descriptor |
|---|---|
| alf_chroma_idc | tu(v) |
| alf_luma_num_filters_signalled_minus1 | tb(v) |
| if( alf_luma_num_filters_signalled_minus1 > 0) { | |
|   for( filtIdx = 0; filtIdx < NumAlfFilters; filtIdx++ ) | |
|     alf_luma_coeff_delta_idx[filtIdx ] | tb(v) |
| } | |
| alf_luma_coeff_delta_flag | u(1) |
| if ( !alf_luma_coeff delta_flag && alf_luma_num_filters_signalled_minus1 > 0) | |
|   alf_luma_coeff_delta_prediction_flag | u(1) |
| alf_luma_min_eg_order_minus1 | ue(v) |
| for( i = 0; i < 3; i++ ) | |
|   alf_luma_eg_order_increase_flag[ i ] | u(1) |
| if ( alf_luma_coeff_delta_flag ) { | |
|   for( sigFiltIdx = 0; sigFiltIdx <= alf_luma_num_filters_signalled_minus1; sigFiltIdx++ ) { | |
|     alf_luma_coeff_flag[ sigFiltIdx ] | u(1) |
|   } | |
|   for( sigFiltIdx = 0; sigFiltIdx <= alf_luma_num_filters_signalled_minus1; sigFiltIdx++ ) { | |
|     if ( alf_luma_coeff_flag[ sigFiltIdx ]) { | |
|       for ( j =0; j <12; j++ ) { | |
|         alf luma_coeff_delta_abs[ sigFiltIdx ][ j ] | uek(v) |
|         if( alf_luma_coeff_delta_abs[ sigFiltIdx [ j ]) | |
|           alf_luma_coeff_delta_sign[ sigFiltIdx ][ j ] | u(1) |
|       } | |
|     } | |
|   } | |
| } | |
| if( alf_chroma_idc > 0) { | |
|   alf_chroma_min_eg_order_minus1 | ue(v) |
|   for( i = 0; i < 2; i++ ) | |
|     alf_chroma_eg_order_increase_flag[ i ] | u(1) |
|   for( j = 0; j < 6; j++ ) { | |
|     alf_chroma_coeff_abs[ j ] | uek(v) |
|     if( alf_chroma_coeff_abs[ j ] > 0 ) | |
|       alf_chroma_coeff_sign[ j ] | u(1) |
|   } | |
| } | |
| } | |

Table 4 is an example of a slice header( ) data in which an APS (e.g. APS 306) can be referred to in a slice header (e.g. slice header 320) as follows by using slice_alf_aps_id[ ] flags.

TABLE 4

| slice_header( ) { | Descriptor |
|---|---|
| slice_pic_parameter_set_id | ue(v) |
| ... | |
|   if( sps_sao_enabled_flag) { | |
|     slice_sao_luma_flag | u(1) |
|     if( ChromaArrayType != 0) | |
|       slice_sao_chroma_flag | u(1) |
|   } | |

TABLE 4-continued

| slice_header( ) { | Descriptor |
|---|---|
| if( sps_alf_enabled_flag) { | |
|   slice_alf_enabled_flag | u(1) |
|   if( slice alf_enabled_flag) { | |
|     num_alf_aps_ids | tb(v) |
|     for( i = 0; i < num_alf_aps_ids; i++ ) | |

TABLE 4-continued

| slice_header( ) { | Descriptor |
|---|---|
|       slice_alf_aps_id[ i ] | u(5) |
|   } | |
| } | |
| ... | u(1) |

In some examples, ALF filter parameters for luma and chroma components are bundled together in the alf_data( ) and are referred to by a single adaptation_parameter_set_id (e.g. as referenced as part of APS 306 of FIG. 3). However, there are cases where only the luma or the chroma ALF filter parameters are to be updated. It can be better to separate the luma and chroma ALF parameter signaling in the APS, and only the parameter set (e.g. luma and/or chroma) that is to be updated can be sent by an encoder for a decoder to utilize.

Systems, methods, apparatuses, and computer-readable media are described for providing improved APSs for filter parameters (e.g., for ALF filters, SAO filters, deblocking filters, and/or other filters). In some examples, the bitstream can include parameters for both luma and chroma filters. Some examples can then include separate flags for each the luma and chroma filters. For example, one flag can signal inclusion of luma filter parameters, and a separate flag can indicate inclusion of chroma filter flags, which allows filter coefficients for luma and chroma filters and filter sets to be signaled separately. For instance, luma and chroma ALF parameter signaling can be separated in the APS with separate flags for luma and chroma ALF filters.

For instance, one flag can be denoted as alf_luma_filter_signaled, which indicates whether a luma filter is in the APS, and the other flag can be denoted as alf_chroma_filter_signaled, which indicates whether a chroma filter is in the APS. The signaling of these two flags can be independent, where the signalling of one flag is independent of the signaling of the other flag. In one example, one APS can contain both luma and chroma filters (e.g., both flags are true). In another example, one APS only includes one or more luma filters and no chroma filters (e.g., alf_luma_filter_signaled is true and alf_chroma_filter_signaled is false). In another example, one APS only includes one or more chroma filters and no luma filters (e.g., alf_luma_filter_signaled is false and alf_chroma_filter_signaled is true). In some cases, the luma and chroma ALF types in APS are signaled in a mutually exclusive manner, in which case only one of them can be present. Thus, as described above, when the bitstream includes a flag, the bitstream is parsed for the associated parameters for that flag. Similarly, if a different type also has a flag indicating a type being used, the bitstream is parsed for the parameters for the second type. If flags for both luma and chroma are signaled, the bitstream is parsed for parameters for both filters. In various implementations as the luma and chroma flags are signaled separately, the bitstream is only parsed for the parameters that are flagged as present. This separate signaling of luma and chroma flags improves the operations of devices performing the parsing by limiting the operations used to identify and use the filter parameters. In some examples, the flags do not control whether coefficients for an APS type are present, but whether they are used. The coefficients can thus be signaled for future pictures. The coefficients are separate from whether the filter is applied in such examples, as coefficients can be sent with a picture where the associated filter type is not used, but the coefficients can then be used for filtering one or more portions of a later picture. By detaching the filter types, additional signaling operations are included to improve the operation of encoding and decoding devices.

In one example, APS type for ALF may not be signaled, but may be inferred or derived. For example, if a number of ALF coefficients is known, then the APS type can be inferred or derived from the number of coefficients when the number of coefficients for each type is unique. In one example, luma ALF may use a number of filter coefficients, and chroma ALF may use another number of filter coefficients. If the number of coefficients are different for the different luma and chroma ALF types, then it can be determined whether coefficients included in a bitstream are for luma or chroma based on the number of coefficients, without explicit APS type signaling in the bitstream.

Based on the above-described techniques, the APS parameter set syntax (adaptation_parameter_set_rbsp( )) can be modified as follows:

TABLE 5

| adaptation_parameter_set_rbsp( ) { | Descriptor |
|---|---|
| adaptation_parameter_set_id | u(5) |
| aps_params_type | u(3) |
| if( aps_params_type = = ALF_LUMA_APS) | |
|   alf_luma_data( ) | |
| else if( aps_params_type = = ALF_CHROMA_APS ) | |
|   alf_chroma_data( ) | |
| else if( aps_params_type = = LMCS_APS ) | |
|   lmcs_data( ) | |
| aps_extension_flag | u(1) |
| if( aps_extension_flag ) | |
|   while( more_rbsp_data( ) ) | |
|     aps_extension_data_flag | u(1) |
| rbsp_trailing_bits( ) | |
| } | | with

TABLE 6

| aps_params_type | Name of aps_params_type | Type of APS parameters |
|---|---|---|
| 0 | ALF_LUMA_APS | ALF luma parameters |
| 1 | ALF_CHROMA_APS | ALF chroma parameters |
| 2 | LMCS_APS | LMCS parameters |
| 3..7 | Reserved | Reserved |

The alf_luma_data( ) can include:

TABLE 7

| alf_luma data( ) { | Descriptor |
|---|---|
| alf_luma_num_filters_signalled_ minus1 | tb(v) |
| if( alf_luma_num_filters_signalled_minus1 > 0) { | |
|   for( filtIdx =0; filtIdx <NumAlfFilters; filtIdx++ ) | |
|     alf_luma_coeff_delta_idx[ filtIdx ] | tb(v) |
|   } | |
| alf_luma_coeff_delta_flag | u(1) |
| if ( !alf_luma_coeff_delta_flag && alf_luma_num_filters_signalled_minus1 >0 ) | |
|   alf_luma_coeff_delta_prediction_flag | u(1) |
| alf_luma_min_eg_order_minus1 | ue(v) |
| for( i = 0; i < 3; i++ ) | |
|   alf_luma_eg_order_increase_flag[ i ] | u(1) |
| if ( alf_luma_coeff_delta_flag ) { | |
|   for( sigFiltIdx = 0; sigFiltIdx <= alf_luma_num_filters_signalled_minus1; sigFiltIdx++ ) | |
|     alf_luma_coeff_flag[ sigFiltIdx ] | u(1) |
|   } | |

TABLE 7-continued

| alf_luma data( ) { | Descriptor |
|---|---|
|   for( sigFiltIdx = 0; sigFiltIdx <= alf_luma_num_filters_signalled_minus1; sigFiltIdx++ ) { | |
|     if ( alf_luma_coeff_flag[ sigFiltIdx ]) { | |
|       for ( j =0; j < 12; j++ ) { | |
|         alf_luma_coeff_delta_abs[ sigFiltIdx ][ j ] | uek(v) |
|         if( alf_luma_coeff_delta_abs[ sigFiltIdx ][ j ]) | |
|           alf_luma_coeff_delta_sign[ sigFiltIdx ][ j ] | u(1) |
|       } | |
|     } | |
|   } | |
| } | |

The associated APS can be referenced from the slice header as follows:

TABLE 8

| slice_header( ) { | Descriptor |
|---|---|
|   slice_pic_parameter_set_id | ue(v) |
|   ... | |
|   if( sps_sao_enabled_flag ) { | |
|     slice_sao_luma_flag | u(1) |
|     if( ChromaArrayType != 0) | |
|       slice_sao_chroma_flag | u(1) |
|   } | |
|   if( sps_alf_enabled_flag ) { | |
|     slice_alf_enabled_flag | u(1) |
|     if( slice_alf_enabled_flag ) { | |
|       num_alf_luma_aps_ids | tb(v) |
|       for( i = 0; i < num_alf_luma_aps_ids; i++ ) | |
|         slice_alf_luma_aps_id[ i ] | u(5) |
|   alf_chroma_idc | tu(v) |
|   if (alf_chroma_idc > 0){ | |
|     num_alf_chroma_aps_ids | tb(v) |
|     for( i =0; i < num_alf_chroma_aps_ids; i++ ) | |
|       slice_alf_chroma_aps_id[ i ] | u(5) |
|   } | |
|   } | |
| ... | |

In some examples, such as in the example of slice header 320 of FIG. 3, the semantics associated with the syntax in the tables above can be as follows:
  num_alf_luma_aps_ids specifies the number of luma ALF APSs that the slice refers to. The value of num_alf_luma_aps_ids shall be in the range of 0 to maxNum, inclusive. maxNum value shall be equal to 1 for IRAP or intra picture type, or 7 otherwise.
  slice_alf_luma_aps_id[i] specifies the adaptation_parameter_set_id of the i-th ALF APS that the slice refers to. The TemporalId of the ALF APS NAL unit having adaptation_parameter_set_id equal to slice_alf_luma_aps_id[i] shall be less than or equal to the TemporalId of the coded slice NAL unit. slice_alf_luma_aps_id[i] shall not refer to the APS derived for other pictures rather than the current picture if the current picture is IRAP or intra.
  num_alf_chroma_aps_ids specifies the number of chroma ALF APSs that the slice refers to. The value of num_alf_chroma_aps_ids shall be in the range of 0 to maxNum, inclusive. maxNum value shall be equal to 1 for IRAP or intra picture type, or 7 otherwise.
  slice_alf_chroma_aps_id[i] specifies the adaptation_parameter_set_id of the i-th ALF APS that the slice refers to. The TemporalId of the ALF APS NAL unit having adaptation_parameter_set_id equal to slice_alf_chroma_aps_id[i] shall be less than or equal to the TemporalId of the coded slice NAL unit.
  Slice_alf_luma_aps_id[i] shall not refer to the APS derived for other pictures rather than the current picture if the current picture is IRAP.

In some cases, num_alf_chroma_aps_ids is not signalled and can be inferred to be 1. In one example, when the max value is 1, for instance, for intra-random access picture (IRAP) or intra picture type picture, when alf_chroma_idc>0, num_alf_chroma_aps_ids is not signalled and can be inferred to be equal to 1.

In some cases, when APS type is split for luma ALF and chroma ALF parameters, when the max value of num_alf_chroma_aps_ids is 1, for example, for IRAP or intra picture type picture, when num_alf_luma_aps is 1, slice_alf_chroma_aps_id[i] is not signalled and is inferred to be slice_alf_luma_aps_id[0].

In some cases, when multiple ALF APSs with the same value of adaptation_parameter_set_id are referred to by two or more slices of the same picture, the multiple ALF APSs with the same value of adaptation_parameter_set_id can or shall have the same content. By contrast, other types can have the same ID, but different content when the type value (e.g. ALF type, LMCS type, etc.) is different.

With respect the num_alf_chroma_aps_ids syntax element, maxNum equal to 7 is used as an illustrative example. In some cases, other values can be specified for maxNum. In one example, the max value may be equal to the size of the APS buffer (e.g., the maximum allowed number of APSs).

In some examples, when a picture is an IRAP (e.g., has an IRAP picture type), then the picture cannot use ALF filters used in one or more previous pictures, since the IRAP picture can be a starting point in the decoding process and the information regarding the one or more previous pictures may not be available. This is the reason maxNum is set to 1 for IRAP pictures in the semantics above. In some cases, setting maxNum to 1 may not be sufficient since any ID still can be signaled, including the ID of the previous picture APS. To solve such an issue, an encoder constraint can be added such that for IRAP picture, an APS ID shall not refer to the APS derived for or from one or more previous pictures. Such a constraint can also be applied to I_SLICE_TYPE.

As described herein, multiple APS for chroma are supported by num_alf_chroma_aps_ids and slice_alf_chroma_aps_id[i]. In chroma CTB, an APS index i can be signaled to identify the slice_alf_chroma_aps_id[i].

In one example, this chroma CTB signaling can be performed in a similar way as it is done for luma, as to signal a flag whether the first APS (e.g., slice_alf_chroma_aps_id[0]) is used, and if not then signal APS index minus 1. One illustrative example of modifications relative to VVC is shown below, where additions are shown with underlined text in between "<insert>" and "<insertend>" symbols (e.g., "<insert>added text <insertend>"):

TABLE 9

| coding_tree_unit( ) { | Descriptor |
|---|---|
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| if( slice_sao_luma_flag \|\| slice_sao_chroma_flag ) | |
|   sao( xCtb >> CtbLog2SizeY, yCtb >> CtbLog2SizeY ) | |
| if( slice_alf_enabled_flag ){ | |
|   alf_ctb_flag[ 0 ][ xCtb >> Log2CtbSize ][ yCtb >> Log2CtbSize | ae(v) |
|   if( alf_ctb_flag[ 0 ][ xCtb >>Log2CtbSize ][yCtb >> Log2CtbSize ]) { | |
|     if( slice_num_alf_aps_ids_luma > 0) | |
|       alf_ctb_use_first_aps_flag | ae(v) |
|     if( !alf_ctb_use_first_aps_flag ) { | |
|       if( slice_num_alf_aps_ids_luma > 1) | |
|         alf_use_aps_flag | ae(v) |
|       if( alf_use_aps_flag) | |
|         alf_luma_prev_filter_idx_minus1 | ae(v) |
|       else | |
|         alf_luma_fixed_filter_idx | ae(v) |
|     } | |
|   } | |
|   if( slice_alf_chroma_idc = = 1 \|\| slice_alf_chroma_idc = = 3 ) | |
|     alf_ctb_flag[ 1 ][ xCtb >> Log2CtbSize ][ yCtb >> Log2CtbSize ] | ae(v) |
|   if( slice_alf_chroma_idc = = 2 \|\| slice_alf_chroma_idc = = 3 ) | |
|     alf_ctb_flag[2 ][xCtb >> Log2CtbSize ][ yCtb >> Log2CtbSize | ae(v) |
| <insert> if( alf_ctb_flag[ i ] [xCtb >> Log2CtbSize ][ yCtb >> Log2CtbSize ] \|\| alf_ctb_flag[ 2 ][ xCtb >> Log2CtbSize ][ yCtb >> Log2CtbSize ] ) { | |
|     if( slice_num_alf_aps_ids_chroma > 0 ) | |
|       alf_chroma_ctb_use_first_aps_flag | |
|     if( !alf_chroma_ctb_use_first_aps_flag ) | |
|       if( slice_num_alf_aps_ids_chroma > 1 ) | |
|         alf_chroma_prev_filter_idx_minus1 | ae(v)) |
|   }<insertend> | |
| } | |
| if( slice_type = = I && qtbtt_dual_tree_intra_flag ) | |
|   dual_tree_implicit_qt_split ( xCtb, yCtb, CtbSizeY, 0 ) | |
| else | |
|   coding_tree( xCtb, yCtb, CtbSizeY, CtbSizeY, 1, 0, 0, 0, 0, 0, | |
|   SINGLE_TREE) | |
| } | |

One illustrative example of modifications relative to the semantics of VVC is shown above and below, where additions are illustrated with text between <insert> and <endinsert> symbols (e.g., "<insert>added text<insertend>"). For example, in table 9 above a change relative to the semantics of VVV is as follows:

<insert>alf_chroma_cth_use_first_aps_flag equal to 1 specifies that the filter information in APS with adaptive_parameter_set_id equal to slice_alf_aps_id_chroma[0] is used. alf_chroma_ctb_use_first_aps flag equal to 0 specifies that the chroma CTB does not use the filter information in APS with adaptive_parameter_set_id equal to slice_alf_aps_id_chroma[0]. When alf_chroma_ctb_use_first_aps_flag is not present, it is inferred to be equal to 1.

alf_chroma_prev_filter_idx_minus1 plus 1 specifies the previous filter that is applied to the chroma CTB. The value of alf_chroma_prev_filter_idx_minus1 shall be in a range of 0 to slice_num_alf_aps_ids_chroma−2, inclusive.

AlfCtbFiltSetIDxC[xCtb>>Log 2CtbSize][yCtb>>Log 2CtbSize] in the table 9 is a variable specifying the filter set index for the chroma CTB at location (xCtb, yCtb). In some examples, this filter set index can be derived as follows:

AlfCtbFiltSetIdxC[ xCtb >> Log2CtbSize ][ yCtb >> Log2CtbSize ] = alf_ctb_chroma_use_first_aps_flag ? 0 : alf_chroma_prev_filter_idx_minus1 + 1<insertend>

In some examples, when chroma ALF is applied, the APS ID is derived from the index signalled in a CTB as:

```
<insert>i =<insertend>
slice_alf_aps_id_chroma[ AlfCtbFiltSetIdxC[ xCtb >> Log2CtbSize ][ yCtb >> Log2
CtbSize ] ]
f[ j ] = AlfCoeff_C[ <insert>i<insertend> ][ j ](8-1255) (f[ j ] = AlfCoeff_C[ i ][ j ],
without the emphasis)
c[ j ] = AlfClip_C[ <insert>i<insertend> [ j ] (8-1256) (c[ j ] = AlfClip_C[ i ][ j ],
without the emphasis)
```

In another alternative example, just an APS index can be signaled for a CTB. In the above example, num_alf_chroma_aps_ids and slice_alf_chroma_aps_id[i] are shared with all chroma components. Alternatively, each chroma component can have its own num_alf_chroma_aps_ids and/or slice_alf_chroma_aps_id[i]. Other examples can be structured in different ways.

In yet another example, the signaling of the chroma CTB APS index and/or the first APS usage flag is shared for both chroma components. In another example, the APS index and/or the first APS usage flag are signaled per each chroma component. In some examples, the context may be shared by both chroma components. In some examples, one chroma component has its own context.

In another example, the first APS usage flag is signaled for both chroma components, but APS index is signaled per each chroma component or vice versa (e.g., the first APS usage flag is signaled per component, but APS index is shared). In the latter case, APS index can be shared unless the chroma (e.g. Cb or Cr) component uses the first APS, in which case the first APS is used regardless of the APS index value.

In yet another example, a flag is signaled whether the above signaling is shared (e.g. applied for both chroma components) or not (e.g. signaling is done separately for each chroma component) for chroma components. A sequence, picture, slice, tile, tile group, brick flag, and/or other signaling can be signaled to indicate whether the signaling is shared or not.

In some cases, the APS ID can be extended. For example, the information in an APS can be associated with one or more types, such as LMCS type, ALF luma type, ALF chroma type, and others. The number of APS buffers can be increased when more types are used, however it also increases the APS ID signaling, which for example may be extended to 6 bits (e.g. using an ID value in the range of 0 to 63) or 7 bits covering range of 0 to 127. In various examples, such a situation leads to the use of more bits in signaling to indicate which APS IDs are used in a slice, tile, and/or picture since the APS ID is not considering the APS type, which is undesirable.

In some examples, the max number of APS IDs which may use a certain type is defined. In one example, the max number of APS IDs may be equal for all types. Then, the APS ID and APS type are signaled, the APS ID is signaled considering the APS type, so the max value controls the APS ID overhead. In other examples, the maximum number of APS IDs can be different for different types.

Figure 4:
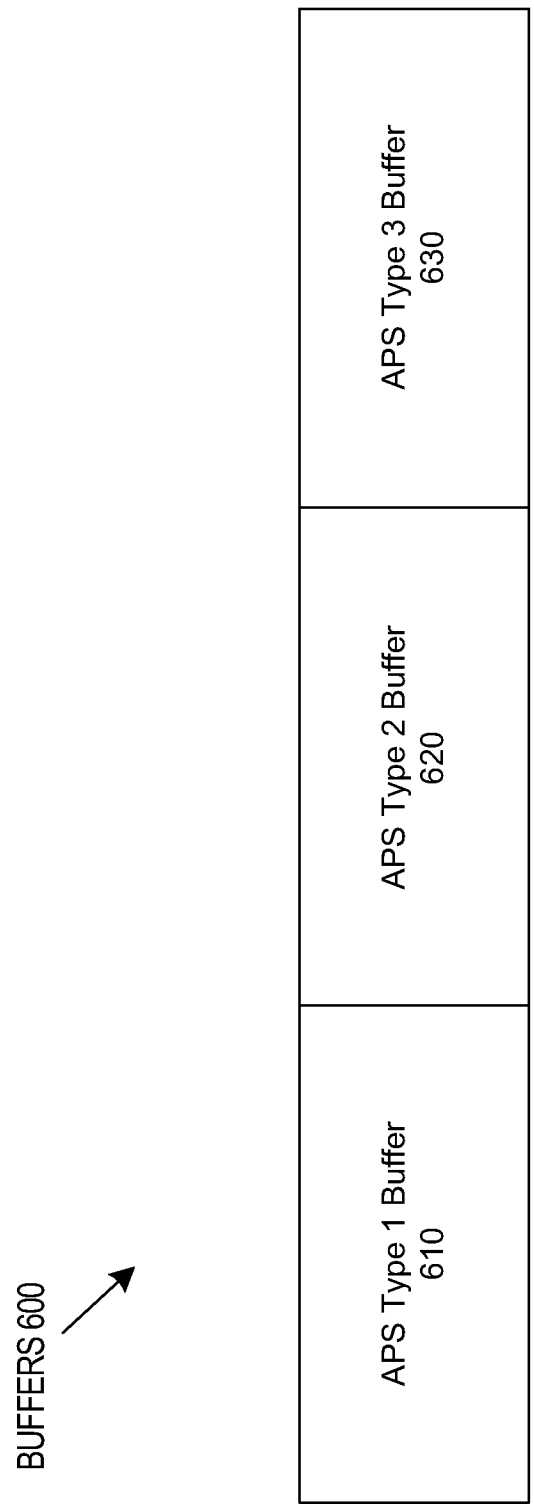
FIG. 4 is a block diagram illustrating examples of buffers for three adaptation parameter sets (APS) types, in accordance with some examples.

In some implementations where the APS IDs are separate for different APS types, a separate APS buffer may be used to store the APS for each APS type. The APS update and replacement specified by the APS ID can be performed considering the APS type. For example, when the APS with the ID is replacing the existed APS in the buffer, the type of the APS is checked to identify which buffer is used. In some cases, different APS types may use the same APS ID, which is not possible when using APS IDs without considering the APS type. An example of APS buffers for 3 types are shown in FIG. 4. Each buffer has an ID from 0 to the max number, which may be APS type dependent.

As a type value is identified from a bitstream, the type value and associated signaling is followed to identify the conditions for the components in the bitstream. For example, when a device is looking at buffer tables for an APS type value, an associated APS value is passed that can allow a buffer table and parsing of the bitstream data to be matched to an APS type value. The parsing of the bitstream is then performed based on the APS type (e.g. parsed data for ALF or for LMCS).

FIG. 4 describes buffers 400, including APS type 1 buffer 410, APS type 2 buffer 420, and APS type 3 buffer 430. While three different buffers are shown in FIG. 4, various examples can have any number of different buffers customized to match the signaled data (e.g. the data in the bitstream) to the APS type and improve the associated system and device operation. Such buffers allow the APS as present in the signaling data to be matched to a buffer based on APS type, and can improve the encoding and decoding devices by avoiding wasted resources where buffers do not match the signaled data (e.g. an APS of a particular type with particular size and associated memory usage). For example, two types are present, an LMCS type and an ALF type. In the example, only one set of LMCS parameters are used, with one associated ID, but eight ALF IDs are used in association with eight different APSs. The overhead for the LMCS is a type value and a one bit ID value, and the overhead for the ALF is the type value and a three bit ID value (e.g. to allow for the eight ALF IDs). In such a system, the APS type 1 buffer 410 can be matched to the LMCS data, and the APS type 2 buffer 420 can be matched to the ALF data. The overhead can thus be matched to the different APS types.

When the APS IDs are signaled in a slice data (e.g., slice header 320 and slice data 330) of a picture (and/or in a picture header of the picture) in a bitstream, the data including the APS IDs indicates which APS IDs are used in a particular slice. Indication of APS IDs can, in some examples, allow a system to consider an APS type based on an ID range (e.g. an identifier space) due to the APS type matching the maximum number of IDs for an APS type (e.g. when each APS type has a different identifier space than other APS types in the system). When APS IDs are signaled for one or more parameter sets, one or more previous parameter sets can be replaced in the corresponding buffer. In the example above, each new LMCS parameter set will replace the old parameter set in the buffer, due to only one set of LMCS parameters being used. A new ALF parameter set will replace one of the previously stored eight parameter sets. This improves the operation of a system by providing the ability to store additional information. The slice header and/or picture header will signal APS IDs, with associated filter parameters parsed from the bitstream based on the information in the slice header and/or picture header. Filters can identified for blocks (e.g., CTUs, CUs, Pus, CTBs, or other blocks) within a slice. The slice header and/or picture header (and/or other signaling information) can identify the filter or filter set that is associated with each block (e.g., CTU, CTB, etc.). As new APSs are signaled, only the buffer associated with the APS type of a new APS is updated. The buffer can be updated based on the buffer types with new information added from the bitstream based on the signaled APS type.

In some implementations, the APS type is removed from the APS signaling and only the APS ID is used to identify the APS in the buffer. In such implementations, an offset value (corresponding to a starting point in the buffer) can be defined for each tool that uses APS. For example, the offset value can be 0 for LMCS, can be 32 for ALF luma, and can be 64 for ALF chroma. When APS IDs are signaled in a slice, tile, or picture, the APS ID is signaled relative to the max value of the APS that can be used per certain tool. The maximum value of the APS ID is 32 for each type in the above example. To reconstruct the absolute APS ID, the offset value is added to the signaled APS ID.

The use of APS type values uniquely identified with an associated ID value thus enables improvements associated with APS type specific buffers such as the different buffers 410, 420, and 430. As the number of bits for different types can be different, the buffer can have memory allocated for the specific APS type. This provides improvements over a common buffer where memory is allocated based on the size of the largest type, rather than having buffers customized to each APS type.

In some implementations, one APS type can be used as an escape code for future APS extensions. For example, if 3 types are used, then the following indices can be used: 00, 01, 10. The value 11 can be used to indicate an escape value, which means if the value is parsed, some other syntax elements can be signaled as defined in the future extensions.

FIG. 5 is a flow diagram illustrating an example process 500 in accordance with some examples. In some examples, process 500 is performed by a decoding device (e.g. decoding device 112). In other examples, process 500 can be implemented as instructions in a non-transitory storage medium that cause a device to perform process 500 when processors of the device execute the instructions. In some cases, when the process 500 is performed by a video decoder, the video data can include a coded picture or a portion (e.g., one or more blocks) of the coded picture included in an encoded video bitstream or can include multiple coded pictures included in the encoded video bitstream.

At block 502, the process 500 obtains an adaptation parameter set identifier value associated with an adaptation parameter set network abstraction layer unit from a bitstream. As described above, coded slices of pictures (e.g. portions of pictures) are encapsulated in the bitstream level into data units called network abstraction layer (NAL) units. The APS ID values for an APS NAL unit are obtained from the bitstream by a decoding device. At block 504, the process 500 obtains an adaptation parameter set type value associated with the adaptation parameter set network abstraction layer unit from the bitstream. A value can be a binary number (e.g. 0, 11, etc.) associated with a type, such as an APS luma type or an APS chroma type. In some implementations, this can involve first and second APSs in a bitstream, with a first APS having luma filter coefficients, and the second APS having chroma filter coefficients. Each set of coefficients can be further associated with a signaling flag for the APS type. In other examples, other types with different filter coefficients and other flags can be present in a bitstream.

Some such examples can further involve flags to independently signal the presence or absence of a particular APS type. In some systems, this can further allow APS parameters to be present with data for a portion of a picture that was not encoded with a particular filter, such that the parameters are available for other pictures or portions of the picture that used the APS type.

In some implementations, a maximum number of APS identifiers that can use a particular APS set type is defined by the APS set type value. This allows the APS set type value to be determined, in some examples, by the signaling of a maximum value or identifier space for the APS identifier. In other examples, the maximum number of APS identifiers for different APS types is the same, and so the APS type can not be determined from this signaling.

In some examples, a first APS type of a plurality of APS types is associated with a first number of identifier values, and a second APS type of the plurality of APS types is associated with a second number of identifier values. The second number of identifier values is different than the first number of identifier values. In some cases, the maximum number of adaptation parameter set identifiers is a same value for each adaptation parameter set type. In some cases, a different number of bits are used for different types of adaptation parameter set identifiers. For example, in a picture header, a slice header, or other signaling mechanism, 2 bits can be used for an LMCS APS Type ID (e.g., LMCS_APS ID (ph_lmcs_aps_id)) and 3 bits can be used for an adaptive loop filter (ALF) APS Type ID (ALF_APS ID (ph_alf_aps_id_luma[i])) and in some cases for a scaling APS Type ID (SCALING_APS_ID (ph_scaling_list_aps_id)).

At block 506, process 500 identifies a first adaptation parameter set associated with at least a portion of at least one picture. In various examples, the first adaptation parameter set is uniquely identified by a combination of the adaptation parameter set type value and the adaptation parameter set identifier value. Additionally, in such examples, the adaptation parameter set identifier value of the first adaptation parameter set is in a range based on the adaptation parameter set type value. At block 508, an adaptive loop filter with parameters defined by the first adaptation parameter set uniquely identified by the adaptation parameter set type value and the adaptation parameter set identifier value is then used to reconstruct the portion of the at least one picture associated with the first adaptation parameter set identified in block 506. As described above, signaling of type and ID values separately enables improvements in the operation of the communication system and devices (e.g. decoder device 112) in the system, such as the use of buffers with memory allocated to match the data in a parameter set exactly, rather than the use of a general buffer where memory is wasted when smaller parameter sets (e.g. APS types with parameter set structures that use fewer bits) are stored in the general buffer. In some such examples, a first adaptation parameter set can include luma filter coefficients and chroma filter coefficients which have different APS types. Independent luma and chroma flags in the bitstream can be used to indicate the presence or use of the luma or chroma filter coefficients.

In various examples, APSs of different types can have a same associated ID, since each APS is uniquely identified by a combination of an ID and type. In some systems, this can involve a second APS in the same bitstream as a first APS different from the second APS to have the same ID with a different type.

Process 500 as described above can be implemented in a variety of devices. In some implementations, process 500 is performed by processing circuitry of a mobile device with a camera coupled to the processor and the memory for capturing and storing the at least one picture. In other examples, process 500 is performed by any device with a display coupled to a processor, with the display configured for displaying the at least one picture as generated using process 500 (e.g., after reconstruction of the at least one picture).

Figure 6:
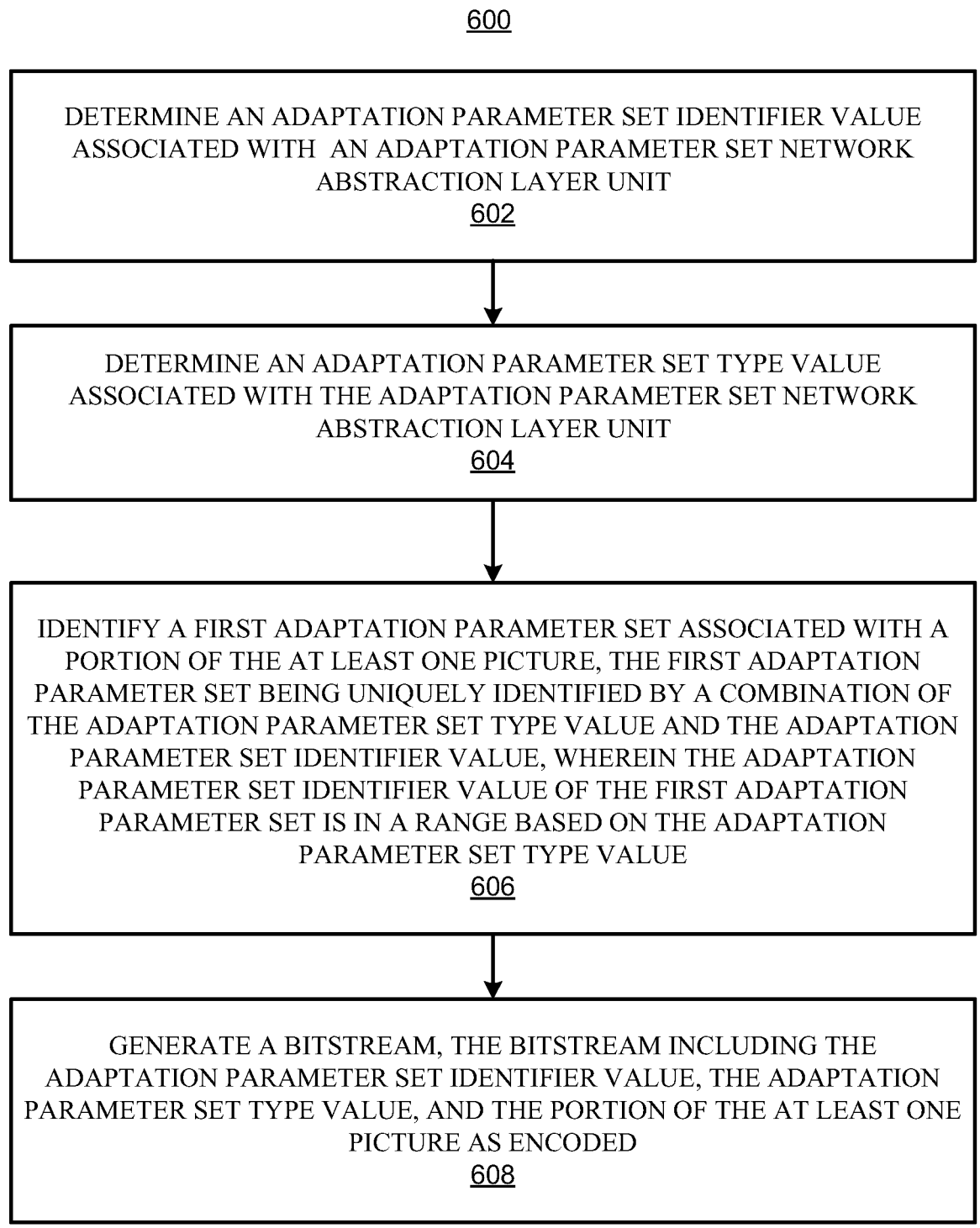
FIG. 6 is a flow diagram illustrating an example method in accordance with various examples described herein.

FIG. 6 is a flow diagram illustrating an example of a process 600 in accordance with some examples. In some examples, process 600 is performed by an encoding device (e.g. encoding device 104). In other examples, process 600 can be implemented as instructions in a non-transitory storage medium that cause a device to perform process 600 when processors of the device execute the instructions. In some cases, when the process 600 is performed by a video encoder, the video data can include a picture or a portion (e.g., one or more blocks) of the picture to be encoded in an encoded video bitstream or can include multiple pictures to be encoded in the encoded video bitstream.

The process 600 can obtain data for at least a portion of at least one picture. For example, the data can be obtained from memory or from one or more image sensors (e.g., one or more cameras). The picture of block is to be encoded and transmitted as part of a bitstream in accordance with using APS parameters as described herein. At block 602, the process 600 determines an adaptation parameter set identifier value associated with an adaptation parameter set network abstraction layer unit, and block 606 of process 600 determines an adaptation parameter set type value associated with the adaptation parameter set network abstraction layer unit. As described herein, the APS identifier value and the APS type value uniquely identify the APS for the APS NAL unit.

At block 608, the process 600 identifies a first adaptation parameter set associated with the portion of the at least one picture. Additionally, the adaptation parameter set identifier value of the first adaptation parameter set is in a range based on the adaptation parameter set type value. As described above, in some examples, the APS set type value is associated with a maximum value based on APS type, and the maximum value (e.g. 5 of a value space from 0-5, 0 of a value space of 0, 2 of a value space of 0-3, etc.) can be used to distinguish between APS types. Additionally, as described above, the use of both type and ID value to uniquely identify an APS enables improved operation of systems and devices performing process 600, such as the use of type specific buffers with memory allocated to exactly match the size of the data for a particular APS type.

The portion of the picture can be included in a bitstream. At block 612 includes generating the bitstream to include the adaptation parameter set identifier value, the adaptation parameter set type value, and the portion of the at least one picture as encoded. In some examples, a maximum number of adaptation parameter set identifiers that can use a particular adaptation parameter set type is defined by the adaptation parameter set type value. In some cases, a first adaptation parameter set type of a plurality of adaptation parameter set types is associated with a first number of identifier values, and a second adaptation parameter set type of the plurality of adaptation parameter set types is associated with a second number of identifier values. The second number of identifier values can be different than the first number of identifier values, as described above. In some examples, the maximum number of adaptation parameter set identifiers is a same value for each adaptation parameter set type. In some examples, a different number of bits are used for different types of adaptation parameter set identifiers. For example, as noted above, in a picture header, slice header, or other signaling mechanism, 2 bits can be used for an LMCS APS Type ID (e.g., LMCS_APS ID (ph_lmcs_aps_id)) and 3 bits can be used for an adaptive loop filter (ALF) APS Type ID (ALF_APS ID (ph_alf_aps_id_luma[i])) and in some cases for a scaling APS Type ID (SCALING_APS_ID (ph_scaling_list_aps_id)).

In some examples, the process 600 can include determining a second adaptation parameter set identifier value associated with a second adaptation parameter set network abstraction layer unit of the video bitstream and determining a second adaptation parameter set type value associated with the second adaptation parameter set network abstraction layer unit of the video bitstream. The process 600 can identify a second adaptation parameter set associated with at least a second portion of the at least one picture, where the second adaptation parameter set is uniquely identified by the second adaptation parameter set type value and the second adaptation parameter set identifier value. The adaptation parameter set identifier value range of the second adaptation parameter set is based on the second adaptation parameter set type value. The process 600 can include, in the bitstream, parameters of the adaptive loop filter defined by the second adaptation parameter set uniquely identified by the second adaptation parameter set type value and the second adaptation parameter set identifier value. At least the second portion of the at least one picture can be reconstructed (e.g., by an encoding device and/or a decoding device) using the adaptive loop filter with the parameters defined by the second adaptation parameter set uniquely identified by the second adaptation parameter set type value and the second adaptation parameter set identifier value.

In some examples, the adaptation parameter set identifier value for the second adaptation parameter set and the adaptation parameter set identifier value for the first adaptation parameter set are a same value. In some cases, the first adaptation parameter set type value is an adaptive loop filter luma type, and the second adaptation parameter set type value is an adaptive loop filter chroma type.

In some implementations, the process 600 can include setting a value for at least one flag associated with the first adaptation parameter set. The at least one flag includes a first flag indicating luma filter data is included in the first adaptation parameter set, a second flag indicating chroma filter data is included in the first adaptation parameter set, or both the first flag and the second flag. In some cases, a value of the first flag and a value of the second flag are set independently.

In some cases, the first adaptation parameter set is uniquely identified by a combination of the adaptation parameter set type value and the adaptation parameter set identifier value as represented by a series of consecutive bits in the bitstream. For instance, a first portion of bits in the series of consecutive bits in the bitstream can represent the adaptation parameter set type value and a second portion of bits in the series of consecutive bits in the bitstream can represent the adaptation parameter set type identifier values. In another example, a first portion of bits in the series of consecutive bits in the bitstream can represent the adaptation parameter set type identifier value, and a second portion of bits following the first portion of bits in the bitstream can represent the adaptation parameter set type value.

In some examples, the first adaptation parameter set includes luma filter coefficients and chroma filter coefficients. The luma filter coefficients can be associated with a second adaptation parameter set type value, and the chroma filter coefficients can be associated with a third adaptation parameter set type value different than the second adaptation parameter set type value. In some cases, the luma filter coefficients are associated with a luma filter signaled flag, and the chroma filter coefficients are associated with a chroma filter signaled flag different than and operates independently from the luma filter signaled flag.

The process 600 can be implemented in a variety of devices. In some implementations, process 600 is performed by processing circuitry of a mobile device with a camera coupled to the processor and the memory for capturing and storing the at least one picture. In other examples, process 500 is performed by any device with a display coupled to a processor, with the display configured for displaying the at least one picture prior to the picture being processed and transmitted in a bitstream using process 600.

In some implementations, the processes (or methods) described herein (including methods 500 and 600) can be performed by a computing device or an apparatus, such as the system 100 shown in FIG. 1. For example, the processes can be performed by the encoding device 104 shown in FIG. 1 and FIG. 7, by another video source-side device or video transmission device, by the decoding device 112 shown in FIG. 1 and FIG. 8, and/or by another client-side device, such as a player device, a display, or any other client-side device. In some cases, the computing device or apparatus may include one or more input devices, one or more processors, one or more microprocessors, one or more microcomputers, and/or other component(s) of a device that are configured to carry out the steps of the processes described herein.

In some examples, the computing device or apparatus may include or be a mobile device, a desktop computer, a server computer and/or server system, or other type of computing device. The components of the computing device (e.g., the one or more input devices, one or more output devices, one or more processors, one or more microprocessors, one or more microcomputers, and/or other component(s)) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, over-the-top television (e.g., Internet streaming television) transmissions, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various examples of the application have been described. Specific details of the encoding device 104 and the decoding device 112 are shown in FIG. 7 and FIG. 8, respectively.

Figure 7:
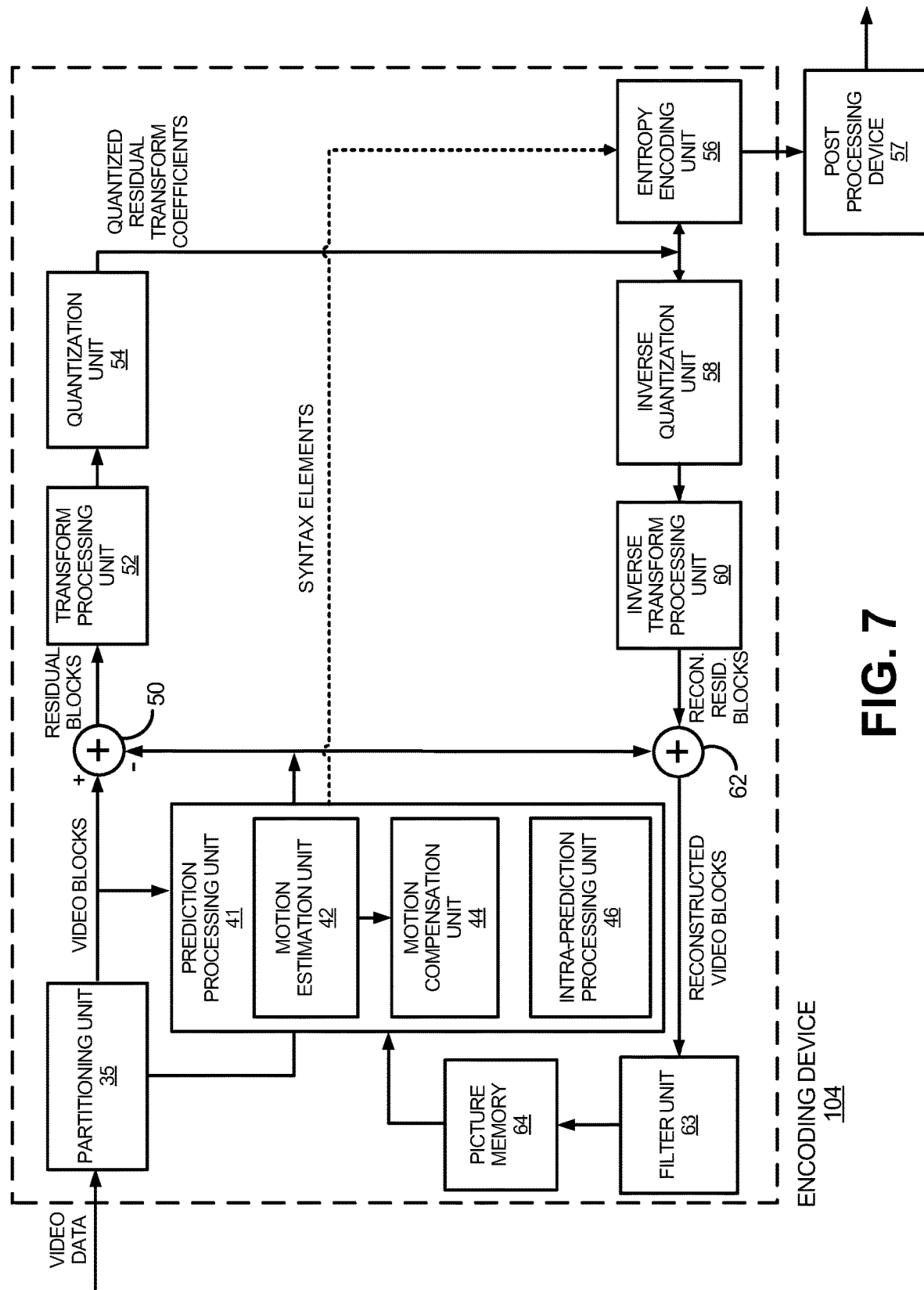
FIG. 7 is a block diagram illustrating an example video encoding device, in accordance with some examples.
Figure 8:
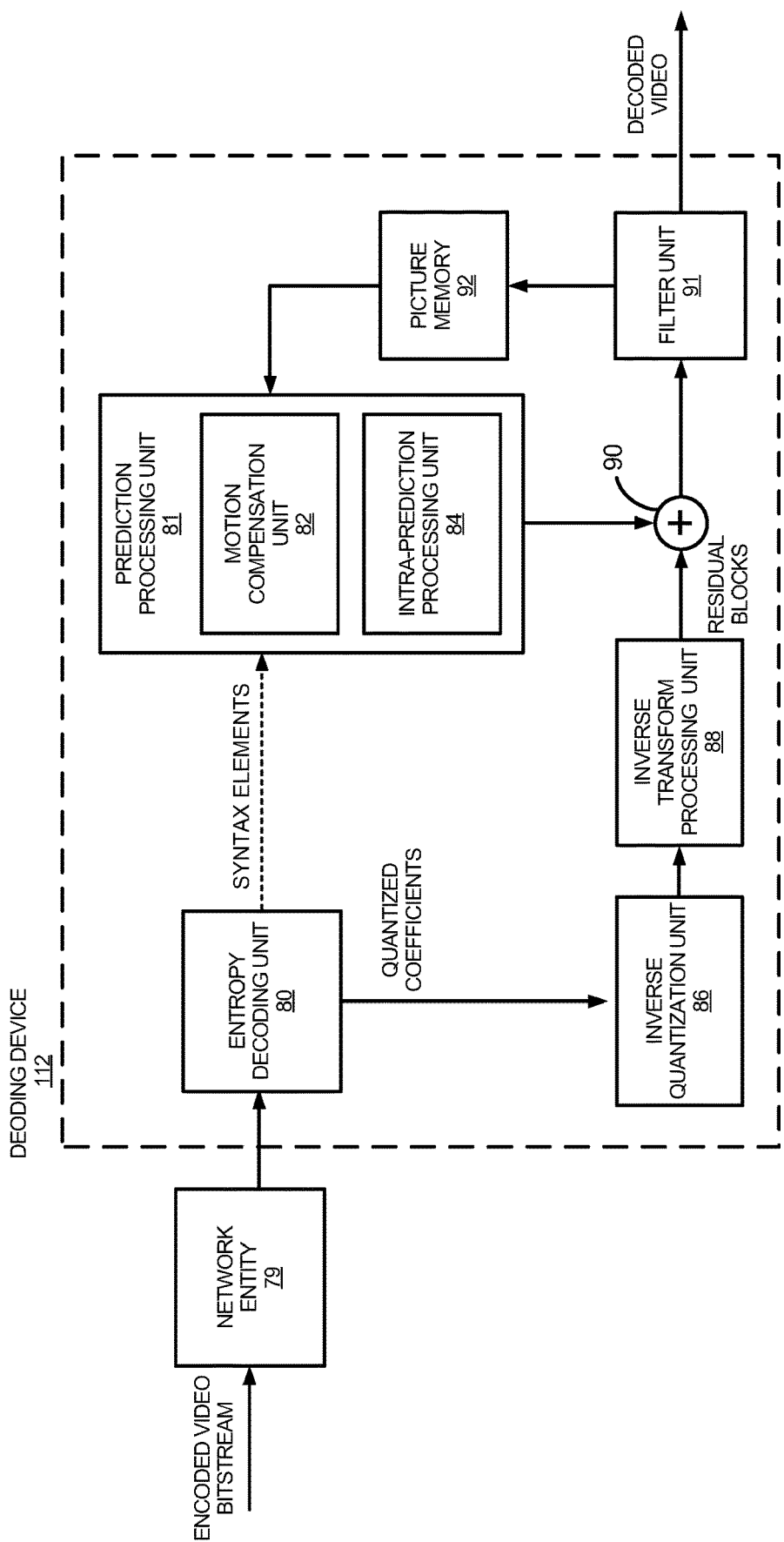
FIG. 8 is a block diagram illustrating an example video decoding device, in accordance with some examples.

Specific details of the encoding device 104 and the decoding device 112 are shown in FIG. 7 and FIG. 8, respectively. FIG. 7 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 7, the encoding device 104 receives video data, and partitioning unit 35 partitions the data into video blocks. The partitioning may also include partitioning into slices, slice segments, tiles, or other larger units, as wells as video block partitioning (e.g., according to a quadtree structure of LCUs and CUs). The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 can intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, (e.g., during separate encoding passes), and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 10 represents an example of a video encoder configured to perform one or more of the techniques described herein, including the processes described above with respect to FIG. 5 and FIG. 6. In some cases, some of the techniques of this disclosure may also be implemented by post processing device 57.

FIG. 8 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 7.

During the decoding process, the decoding device 112 receives an encoded video bitstream that represents video blocks of an encoded video slice and associated syntax elements sent by the encoding device 104. In some examples, the decoding device 112 may receive the encoded video bitstream from the encoding device 104. In some examples, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 8 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 8 represents an example of a video decoder configured to perform one or more of the techniques described herein, including the processes described above with respect to FIG. 5 and FIG. 6.

The filter unit 91 filters the reconstructed block (e.g. the output of summer 90) and stores the filtered reconstructed block in DPB 94 for uses as a reference block and/or outputs the filtered reconstructed block (decoded video). The reference block may be used by motion compensation unit 82 as a reference block to inter-predict a block in a subsequent video frame or picture. The filter unit 91 may perform any type of filtering such as deblocking filtering, SAO filtering, peak SAO filtering, ALF, and/or GALF, and/or other types of loop filters. A deblocking filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

In addition, the filter unit 91 may be configured to perform any of the techniques in this disclosure related to adaptive loop filtering. For example, as described above, filter unit 91 may be configured to determine parameters for filtering a current block based on parameters for filtering a previous block that were included in the same APS as the current block, a different APS, or pre-defined filters.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples and examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1

A method of processing video data, the method comprising: obtaining an encoded video bitstream including an adaptation parameter set associated with at least one picture of the encoded video bitstream, the adaptation parameter set including adaptive loop filter data for the at least one picture; and decoding at least one of a first syntax element and a second syntax element from the adaptation parameter set, the first syntax element including adaptive loop filter data for a luma component of the at least one picture, and the second syntax element including adaptive loop filter data for chroma components of the at least one picture.

Example 2

The method of example 1, wherein the encoded video bitstream includes a first flag and a second flag, the first flag indicating whether luma adaptive loop filters are signaled in the adaptation parameter set, and the second flag indicating whether chroma adaptive loop filters are signaled in the adaptation parameter set.

Example 3

The method of example 2, wherein signaling of the first flag is independent of signaling of the second flag.

Example 4

The method of any one of examples 2 to 3, wherein when the first flag is set to a first value and the second flag is set to a second value, the adaptation parameter set includes the first syntax element and not the second syntax element.

Example 5

The method of any one of examples 2 to 3, wherein when the second flag is set to a first value and the first flag is set to a second value, the adaptation parameter set includes the second syntax element and not the first syntax element.

Example 6

The method of any one of examples 2 to 5, wherein the adaptation parameter set only includes the first syntax element.

Example 7

The method of any one of examples 2 to 5, wherein the adaptation parameter set only includes the second syntax element.

Example 8

The method of any one of examples 2 to 3, wherein when the first flag is set to a first value and the second flag is set to the first value, the adaptation parameter set includes the first syntax element and the second syntax element.

Example 9

The method of any one of examples 1 to 8, wherein a maximum number of adaptation parameter set identifiers that can use a particular adaptation parameter set type is defined.

Example 10

The method of any one of examples 1 to 9, wherein separate adaptation parameter set buffers are used to store adaptation parameter sets for different adaptation parameter set types.

Example 11

The method of any one of examples 1 to 10, wherein a first adaptation parameter set buffer is used to store one or more adaptation parameter sets for a first adaptation parameter set type, and wherein a second adaptation parameter set buffer is used to store one or more adaptation parameter sets for a second adaptation parameter set type.

Example 12

An apparatus comprising a memory configured to store video data and a processor configured to process the video data according to any of examples 1 to 11.

Example 13

The apparatus of example 12, wherein the apparatus includes a decoder.

Example 14

The apparatus of any one of examples 12 to 13, wherein the apparatus is a mobile device.

Example 15

The apparatus of any one of examples 12 to 14, further comprising a display configured to display the video data.

Example 16

The apparatus of any one of examples 12 to 15, further comprising a camera configured to capture one or more pictures.

Example 17

A computer readable medium having stored thereon instructions that when executed by a processor perform the methods of any of examples 1 to 11.

Example 18

A method of processing video data, the method comprising: generating an encoded video bitstream including an adaptation parameter set associated with at least one picture of the encoded video bitstream, the adaptation parameter set including adaptive loop filter data for the at least one picture; and providing, in the adaptation parameter set, at least one of a first syntax element and a second syntax element, the first syntax element including adaptive loop filter data for a luma component of the at least one picture, and the second syntax element including adaptive loop filter data for chroma components of the at least one picture.

Example 19

The method of example 18, further comprising providing, in the encoded video bitstream, a first flag and a second flag, the first flag indicating whether luma adaptive loop filters are signaled in the adaptation parameter set, and the second flag indicating whether chroma adaptive loop filters are signaled in the adaptation parameter set.

Example 20

The method of example 19, wherein signaling of the first flag is independent of signaling of the second flag.

Example 21

The method of anyone of examples 19 to 20, wherein when the first flag is set to a first value and the second flag is set to a second value, the adaptation parameter set includes the first syntax element and not the second syntax element.

Example 22

The method of any one of examples 19 to 20, wherein when the second flag is set to a first value and the first flag is set to a second value, the adaptation parameter set includes the second syntax element and not the first syntax element.

Example 23

The method of any one of examples 18 to 22, wherein the adaptation parameter set only includes the first syntax element.

Example 24

The method of any one of examples 18 to 22, wherein the adaptation parameter set only includes the second syntax element.

Example 25

The method of any one of examples 19 to 20, wherein when the first flag is set to a first value and the second flag is set to the first value, the adaptation parameter set includes the first syntax element and the second syntax element.

Example 26

The method of any one of examples 18 to 25, wherein a maximum number of adaptation parameter set identifiers that can use a particular adaptation parameter set type is defined.

Example 27

The method of any one of examples 18 to 26, wherein separate adaptation parameter set buffers are used to store adaptation parameter sets for different adaptation parameter set types.

Example 28

The method of any one of examples 18 to 27, wherein a first adaptation parameter set buffer is used to store one or more adaptation parameter sets for a first adaptation parameter set type, and wherein a second adaptation parameter set buffer is used to store one or more adaptation parameter sets for a second adaptation parameter set type.

Example 29

An apparatus comprising a memory configured to store video data and a processor configured to process the video data according to any of examples 18 to 28.

Example 30

The apparatus of example 29, wherein the apparatus includes an encoder.

Example 31

The apparatus of anyone of examples 29 to 30, wherein the apparatus is a mobile device.

Example 32

The apparatus of anyone of examples 29 to 31, further comprising a display configured to display the video data.

Example 33

The apparatus of any one of examples 29 to 32, further comprising a camera configured to capture one or more pictures.

Example 34

A computer readable medium having stored thereon instructions that when executed by a processor perform the methods of any of examples 18 to 28.

Example 35

A method of processing video data, the method comprising: obtaining an encoded video bitstream including an adaptation parameter set associated with at least one picture of the encoded video bitstream; and determining a number of filter coefficients of an adaptive loop filter; and deriving a type of the adaptation parameter set based on the number of filter coefficients of the adaptive loop filter, the type indicating whether the adaptation parameter set is associated with one or more of a luma filter or a chroma filter.

Example 36

The method of example 35, wherein a number of filter coefficients of the luma filter is different than a number of filter coefficients of the chroma filter.

Example 37

The method of any one of examples 35 to 36, further comprising: determining the number of filter coefficients of the adaptive loop filter correspond to the number of filter coefficients of the luma filter; and deriving the type of the adaptation parameter set to be a first type, the first type indicating the adaptation parameter set is associated with the luma filter.

Example 38

The method of any one of examples 35 to 36, further comprising: determining the number of filter coefficients of the adaptive loop filter correspond to the number of filter coefficients of the chroma filter; and deriving the type of the adaptation parameter set to be a second type, the second type indicating the adaptation parameter set is associated with the chroma filter.

Example 39

An apparatus comprising a memory configured to store video data and a processor configured to process the video data according to any of examples 35 to 38.

Example 40

The apparatus of example 39, wherein the apparatus includes a decoder.

Example 41

The apparatus of anyone of examples 39 to 40, wherein the apparatus is a mobile device.

Example 42

The apparatus of any one of examples 39 to 41, further comprising a display configured to display the video data.

Example 43

The apparatus of any one of examples 39 to 42, further comprising a camera configured to capture one or more pictures.

Example 44

A computer readable medium having stored thereon instructions that when executed by a processor perform the methods of any of examples 35 to 38.

Example 45

A method of processing video data, the method comprising: generating an encoded video bitstream, the encoded video bitstream including multiple adaptation parameter sets for at least one chroma sample of a picture, the multiple adaptation parameter sets including adaptive loop filter data; and providing, in the encoded video bitstream, an index indicating an identifier of an adaptation parameter set of the multiple adaptation parameter sets that applies to a slice of the picture.

Example 46

The method of example 45, wherein the at least one chroma sample includes a coding tree block of chroma samples.

Example 47

The method of any one of examples 45 to 46, further comprising providing, in the encoded video bitstream, a flag when the index indicates an identifier of a first adaptation parameter set.

Example 48

The method of any one of examples 45 to 46, further comprising providing, in the encoded video bitstream, the index minus 1 when the index indicates an identifier other than a first adaptation parameter set.

Example 49

An apparatus comprising a memory configured to store video data and a processor configured to process the video data according to any of examples 18 to 28.

Example 50

The apparatus of example 49, wherein the apparatus includes an encoder.

Example 51

The apparatus of anyone of examples 49 to 50, wherein the apparatus is a mobile device.

Example 52

The apparatus of any one of examples 49 to 51, further comprising a display configured to display the video data.

Example 53

The apparatus of any one of examples 49 to 52, further comprising a camera configured to capture one or more pictures.

Example 54

A computer readable medium having stored thereon instructions that when executed by a processor perform the methods of any of examples 45 to 48.

Example 55

A method of processing video data, the method comprising: obtaining an encoded video bitstream, the encoded video bitstream including multiple adaptation parameter sets for at least one chroma sample of a picture, the multiple adaptation parameter sets including adaptive loop filter data; and decoding, from the encoded video bitstream, an index indicating an identifier of an adaptation parameter set of the multiple adaptation parameter sets that applies to a slice of the picture.

Example 56

The method of example 55, wherein the at least one chroma sample includes a coding tree block of chroma samples.

Example 57

The method of any one of examples 55 to 56, wherein the encoded video bitstream includes a flag when the index indicates an identifier of a first adaptation parameter set.

Example 58

The method of any one of examples 55 to 56, wherein the encoded video bitstream includes the index minus 1 when the index indicates an identifier other than a first adaptation parameter set.

Example 59

An apparatus comprising a memory configured to store video data and a processor configured to process the video data according to any of examples 55 to 58.

Example 60

The apparatus of example 59, wherein the apparatus includes a decoder.

Example 61

The apparatus of anyone of examples 49 to 60, wherein the apparatus is a mobile device.

Example 62

The apparatus of any one of examples 49 to 61, further comprising a display configured to display the video data.

Example 63

The apparatus of any one of examples 49 to 62, further comprising a camera configured to capture one or more pictures.

Example 64

A computer readable medium having stored thereon instructions that when executed by a processor perform the methods of any of examples 55 to 58.

Example 65

An apparatus for decoding video data, the apparatus comprising a memory and a processor implemented in circuitry. The processor is configured to: obtain, from a bitstream, an adaptation parameter set identifier value associated with an adaptation parameter set network abstraction layer unit; obtain, from the bitstream, an adaptation parameter set type value associated with the adaptation parameter set network abstraction layer unit; identify a first adaptation parameter set associated with at least a portion of at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and reconstruct the portion of the at least one picture using an adaptive loop filter with parameters defined by the first adaptation parameter set uniquely identified by the adaptation parameter set type value and the adaptation parameter set identifier value.

Example 66

The apparatus of example 65, wherein a maximum number of adaptation parameter set identifiers that can use a particular adaptation parameter set type is defined by the adaptation parameter set type value.

Example 67

The apparatus of example 66, wherein a first adaptation parameter set type of a plurality of adaptation parameter set types is associated with a first number of identifier values, and wherein a second adaptation parameter set type of the plurality of adaptation parameter set types is associated with a second number of identifier values, the second number of identifier values being different than the first number of identifier values.

Example 68

The apparatus of any one of examples 66 to 67, wherein the maximum number of adaptation parameter set identifiers is a same value for each adaptation parameter set type.

Example 69

The apparatus of any one of examples 66 to 68, wherein a different number of bits are used for different types of adaptation parameter set identifiers.

Example 70

The apparatus of any one of examples 65 to 69, wherein the processor is configured to: determine a second adaptation parameter set identifier value associated with a second adaptation parameter set network abstraction layer unit of the video bitstream; determine a second adaptation parameter set type value associated with the second adaptation parameter set network abstraction layer unit of the video bitstream; identify a second adaptation parameter set associated with at least a second portion of the at least one picture, the second adaptation parameter set being uniquely identified by the second adaptation parameter set type value and the second adaptation parameter set identifier value, wherein the adaptation parameter set identifier value range of the second adaptation parameter set is based on the second adaptation parameter set type value; and reconstruct at least the second portion of the at least one picture of the video bitstream using the adaptive loop filter with parameters defined by the second adaptation parameter set uniquely identified by the second adaptation parameter set type value and the second adaptation parameter set identifier value.

Example 71

The apparatus of example 70, wherein the adaptation parameter set identifier value for the second adaptation parameter set and the adaptation parameter set identifier value for the first adaptation parameter set are a same value.

Example 72

The apparatus of any one of examples 70 to 71, wherein the first adaptation parameter set type value is an adaptive loop filter luma type, and wherein the second adaptation parameter set type value is an adaptive loop filter chroma type.

Example 73

The apparatus of any one of examples 65 to 72, wherein the processor is configured to: identify at least one flag associated with the first adaptation parameter set, the at least one flag including at least one or more of a first flag indicating luma filter data is included in the first adaptation parameter set or a second flag indicating chroma filter data is included in the first adaptation parameter set.

Example 74

The apparatus of example 73, wherein a value of the first flag and a value of the second flag are set independently.

Example 75

The apparatus of any one of examples 65 to 74, wherein the processor is configured to: configure a first adaptation parameter set buffer for a first adaptation parameter set type; and configure a second adaptation parameter set buffer for a second adaptation parameter set type.

Example 76

The apparatus of example 75, wherein the processor is configured to: store received bits of the first adaptation parameter set having the first adaptation parameter set type in the first adaptation parameter set buffer; and store received bits of a second adaptation parameter set having the second adaptation parameter set type in the second adaptation parameter set buffer.

Example 77

The apparatus of any one of examples 65 to 76, wherein the processor is configured to: configure a first buffer for a first adaptation parameter set type of a plurality of adaptation parameter set types, the first buffer having a first identifier set range smaller than a maximum identifier value.

Example 78

The apparatus of example 77, wherein the processor is configured to: configure a second buffer for a second adaptation parameter set type of the plurality of adaptation parameter set types, the second buffer having a second identifier set range smaller than the maximum identifier value, wherein the second identifier set range is different than the first identifier set range.

Example 79

The apparatus of any one of examples 65 to 78, wherein the processor is configured to: interpret the adaptation parameter set identifier value using the adaptation parameter set type value.

Example 80

The apparatus of any one of examples 65 to 79, wherein the first adaptation parameter set is uniquely identified by a combination of the adaptation parameter set type value and the adaptation parameter set identifier value as represented by a series of consecutive bits in the bitstream.

Example 81

The apparatus of example 80, wherein a first portion of bits in the series of consecutive bits in the bitstream represents the adaptation parameter set type value and a second portion of bits in the series of consecutive bits in the bitstream represents the adaptation parameter set type identifier values.

Example 82

The apparatus of example 80, wherein a first portion of bits in the series of consecutive bits in the bitstream represents the adaptation parameter set type identifier value, and wherein a second portion of bits following the first portion of bits in the bitstream represents the adaptation parameter set type value.

Example 83

The apparatus of any one of examples 65 to 82, wherein the first adaptation parameter set includes luma filter coefficients and chroma filter coefficients, wherein the luma filter coefficients are associated with a second adaptation parameter set type value, and wherein the chroma filter coefficients are associated with a third adaptation parameter set type value different than the second adaptation parameter set type value.

Example 84

The apparatus of example 83, wherein the luma filter coefficients are associated with a luma filter signaled flag, and wherein the chroma filter coefficients are associated with a chroma filter signaled flag different than and operates independently from the luma filter signaled flag.

Example 85

The apparatus of any one of examples 65 to 84, wherein the apparatus comprises a mobile device with a display configured to display the at least one picture.

Example 86

The apparatus of any one of examples 65 to 85, further comprising a display coupled to the processor, the display configured to display the at least one picture.

Example 87

A method for decoding video data, the method comprising: obtaining, from a bitstream, an adaptation parameter set identifier value associated with an adaptation parameter set network abstraction layer unit; obtaining, from the bitstream, an adaptation parameter set type value associated with the adaptation parameter set network abstraction layer unit; identifying a first adaptation parameter set associated with at least a portion of at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and reconstructing the portion of the at least one picture using an adaptive loop filter with parameters defined by the first adaptation parameter set uniquely identified by the adaptation parameter set type value and the adaptation parameter set identifier value.

Example 88

The method of example 87, wherein a maximum number of adaptation parameter set identifiers that can use a particular adaptation parameter set type is defined by the adaptation parameter set type value.

Example 89

The method of example 88, wherein a first adaptation parameter set type of a plurality of adaptation parameter set types is associated with a first number of identifier values, and wherein a second adaptation parameter set type of the plurality of adaptation parameter set types is associated with a second number of identifier values, the second number of identifier values being different than the first number of identifier values.

Example 90

The method of any one of examples 88 to 89, wherein the maximum number of adaptation parameter set identifiers is a same value for each adaptation parameter set type.

Example 91

The method of any one of examples 88 to 90, wherein a different number of bits are used for different types of adaptation parameter set identifiers.

Example 92

The method of any one of examples 87 to 91, further comprising: determining a second adaptation parameter set identifier value associated with a second adaptation parameter set network abstraction layer unit of the video bitstream; determining a second adaptation parameter set type value associated with the second adaptation parameter set network abstraction layer unit of the video bitstream; identifying a second adaptation parameter set associated with at least a second portion of the at least one picture, the second adaptation parameter set being uniquely identified by the second adaptation parameter set type value and the second adaptation parameter set identifier value, wherein the adaptation parameter set identifier value range of the second adaptation parameter set is based on the second adaptation parameter set type value; and reconstructing at least the second portion of the at least one picture of the video bitstream using the adaptive loop filter with parameters defined by the second adaptation parameter set uniquely identified by the second adaptation parameter set type value and the second adaptation parameter set identifier value.

Example 93

The method of example 92, wherein the adaptation parameter set identifier value for the second adaptation parameter set and the adaptation parameter set identifier value for the first adaptation parameter set are a same value.

Example 94

The method of any one of examples 92 to 93, wherein the first adaptation parameter set type value is an adaptive loop filter luma type, and wherein the second adaptation parameter set type value is an adaptive loop filter chroma type.

Example 95

The method of any one of examples 87 to 94, further comprising: identifying at least one flag associated with the first adaptation parameter set, the at least one flag including at least one or more of a first flag indicating luma filter data is included in the first adaptation parameter set or a second flag indicating chroma filter data is included in the first adaptation parameter set.

Example 96

The method of example 95, wherein a value of the first flag and a value of the second flag are set independently.

Example 97

The method of any one of examples 87 to 96, further comprising: configuring a first adaptation parameter set buffer for a first adaptation parameter set type; and configuring a second adaptation parameter set buffer for a second adaptation parameter set type.

Example 98

The method of example 97, further comprising: storing received bits of the first adaptation parameter set having the first adaptation parameter set type in the first adaptation parameter set buffer; and storing received bits of a second adaptation parameter set having the second adaptation parameter set type in the second adaptation parameter set buffer.

Example 99

The method of any one of examples 87 to 98, further comprising: configuring a first buffer for a first adaptation parameter set type of a plurality of adaptation parameter set types, the first buffer having a first identifier set range smaller than a maximum identifier value.

Example 100

The method of example 99, further comprising: configuring a second buffer for a second adaptation parameter set type of the plurality of adaptation parameter set types, the second buffer having a second identifier set range smaller than the maximum identifier value, wherein the second identifier set range is different than the first identifier set range.

Example 101

The method of any one of examples 87 to 100, further comprising: interpreting the adaptation parameter set identifier value using the adaptation parameter set type value.

Example 102

The method of any one of examples 87 to 101, wherein the first adaptation parameter set is uniquely identified by a combination of the adaptation parameter set type value and the adaptation parameter set identifier value as represented by a series of consecutive bits in the bitstream.

Example 103

The method of example 102, wherein a first portion of bits in the series of consecutive bits in the bitstream represents the adaptation parameter set type value and a second portion of bits in the series of consecutive bits in the bitstream represents the adaptation parameter set type identifier values.

Example 104

The method of example 102, wherein a first portion of bits in the series of consecutive bits in the bitstream represents the adaptation parameter set type identifier value, and wherein a second portion of bits following the first portion of bits in the bitstream represents the adaptation parameter set type value.

Example 105

The method of any one of examples 87 to 104, wherein the first adaptation parameter set includes luma filter coefficients and chroma filter coefficients, wherein the luma filter coefficients are associated with a second adaptation parameter set type value, and wherein the chroma filter coefficients are associated with a third adaptation parameter set type value different than the second adaptation parameter set type value.

Example 106

The method of example 105, wherein the luma filter coefficients are associated with a luma filter signaled flag, and wherein the chroma filter coefficients are associated with a chroma filter signaled flag different than and operates independently from the luma filter signaled flag.

Example 107

The method of any one of examples 87 to 106, wherein the method comprises a mobile device with a display configured to display the at least one picture.

Example 108

The method of any one of examples 87 to 107, further comprising a display coupled to the processor, the display configured to display the at least one picture.

Example 109

An apparatus for encoding video data, the apparatus comprising a memory and a processor implemented in circuitry. The processor is configured to: determine an adaptation parameter set identifier value associated with an adaptation parameter set network abstraction layer unit; determine an adaptation parameter set type value associated with the adaptation parameter set network abstraction layer unit; identify a first adaptation parameter set associated with a portion of the at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and generate a bitstream, the bitstream including the adaptation parameter set identifier value, the adaptation parameter set type value, and the portion of the at least one picture as encoded.

Example 110

The apparatus of example 109, wherein a maximum number of adaptation parameter set identifiers that can use a particular adaptation parameter set type is defined by the adaptation parameter set type value.

Example 111

The apparatus of any one of examples 109 to 110, wherein a first adaptation parameter set type of a plurality of adaptation parameter set types is associated with a first number of identifier values, and wherein a second adaptation parameter set type of the plurality of adaptation parameter set types is associated with a second number of identifier values, the second number of identifier values being different than the first number of identifier values.

Example 112

The apparatus of any one of examples 110 to 111, wherein the maximum number of adaptation parameter set identifiers is a same value for each adaptation parameter set type.

Example 113

The apparatus of any one of examples 110 to 112, wherein a different number of bits are used for different types of adaptation parameter set identifiers.

Example 114

The apparatus of any one of examples 109 to 113, wherein the processor is configured to: determine a second adaptation parameter set identifier value associated with a second adaptation parameter set network abstraction layer unit of the video bitstream; determine a second adaptation parameter set type value associated with the second adaptation parameter set network abstraction layer unit of the video bitstream; identifying a second adaptation parameter set associated with at least a second portion of the at least one picture, the second adaptation parameter set being uniquely identified by the second adaptation parameter set type value and the second adaptation parameter set identifier value, wherein the adaptation parameter set identifier value range of the second adaptation parameter set is based on the second adaptation parameter set type value; and include in the bitstream, parameters of the adaptive loop filter defined by the second adaptation parameter set uniquely identified by the second adaptation parameter set type value and the second adaptation parameter set identifier value.

Example 115

The apparatus of example 114, wherein the adaptation parameter set identifier value for the second adaptation parameter set and the adaptation parameter set identifier value for the first adaptation parameter set are a same value.

Example 116

The apparatus of any one of examples 114 to 115, wherein the first adaptation parameter set type value is an adaptive loop filter luma type, and wherein the second adaptation parameter set type value is an adaptive loop filter chroma type.

Example 117

The apparatus of any one of examples 109 to 116, wherein the processor is configured to: set a value for at least one flag associated with the first adaptation parameter set, the at least one flag including at least one or more of a first flag indicating luma filter data is included in the first adaptation parameter set or a second flag indicating chroma filter data is included in the first adaptation parameter set.

Example 118

The apparatus of example 117, wherein a value of the first flag and a value of the second flag are set independently.

Example 119

The apparatus of any one of examples 109 to 118, wherein the first adaptation parameter set is uniquely identified by a combination of the adaptation parameter set type value and the adaptation parameter set identifier value as represented by a series of consecutive bits in the bitstream.

Example 120

The apparatus of example 119, wherein a first portion of bits in the series of consecutive bits in the bitstream represents the adaptation parameter set type value and a second portion of bits in the series of consecutive bits in the bitstream represents the adaptation parameter set type identifier values.

Example 121

The apparatus of example 119, wherein a first portion of bits in the series of consecutive bits in the bitstream represents the adaptation parameter set type identifier value, and wherein a second portion of bits following the first portion of bits in the bitstream represents the adaptation parameter set type value.

Example 122

The apparatus of any one of examples 109 to 121, wherein the first adaptation parameter set includes luma filter coefficients and chroma filter coefficients, wherein the luma filter coefficients are associated with a second adaptation parameter set type value, and wherein the chroma filter coefficients are associated with a third adaptation parameter set type value different than the second adaptation parameter set type value.

Example 123

The apparatus of example 122, wherein the luma filter coefficients are associated with a luma filter signaled flag, and wherein the chroma filter coefficients are associated with a chroma filter signaled flag different than and operates independently from the luma filter signaled flag.

Example 124

The apparatus of any one of examples 109 to 123, wherein the apparatus comprises a mobile device with a camera configured to capture the at least one picture.

Example 125

The apparatus of any one of examples 109 to 124, wherein the apparatus comprises a mobile device with a display configured to display the at least one picture.

Example 126

The apparatus of any one of examples 109 to 125, further comprising a display coupled to the processor, the display configured to display the at least one picture.

Example 127

A method of encoding video data, the method comprising: determining an adaptation parameter set identifier value associated with an adaptation parameter set network abstraction layer unit; determining an adaptation parameter set type value associated with the adaptation parameter set network abstraction layer unit; identify a first adaptation parameter set associated with a portion of the at least one picture, the first adaptation parameter set being uniquely identified by a combination of the adaptation parameter set type value and the adaptation parameter set identifier value, wherein the adaptation parameter set identifier value of the first adaptation parameter set is in a range based on the adaptation parameter set type value; and generating a bitstream, the bitstream including the adaptation parameter set identifier value, the adaptation parameter set type value, and the portion of the at least one picture as encoded.

Example 128

The method of example 127, wherein a maximum number of adaptation parameter set identifiers that can use a particular adaptation parameter set type is defined by the adaptation parameter set type value.

Example 129

The method of any one of examples 127 to 128, wherein a first adaptation parameter set type of a plurality of adaptation parameter set types is associated with a first number of identifier values, and wherein a second adaptation parameter set type of the plurality of adaptation parameter set types is associated with a second number of identifier values, the second number of identifier values being different than the first number of identifier values.

Example 130

The method of any one of examples 110 to 129, wherein the maximum number of adaptation parameter set identifiers is a same value for each adaptation parameter set type.

Example 131

The method of any one of examples 110 to 130, wherein a different number of bits are used for different types of adaptation parameter set identifiers.

Example 132

The method of any one of examples 127 to 131, wherein the processor is configured to: determine a second adaptation parameter set identifier value associated with a second adaptation parameter set network abstraction layer unit of the video bitstream; determine a second adaptation parameter set type value associated with the second adaptation parameter set network abstraction layer unit of the video bitstream; identifying a second adaptation parameter set associated with at least a second portion of the at least one picture, the second adaptation parameter set being uniquely identified by the second adaptation parameter set type value and the second adaptation parameter set identifier value, wherein the adaptation parameter set identifier value range of the second adaptation parameter set is based on the second adaptation parameter set type value; and include in the bitstream, parameters of the adaptive loop filter defined by the second adaptation parameter set uniquely identified by the second adaptation parameter set type value and the second adaptation parameter set identifier value.

Example 133

The method of example 132, wherein the adaptation parameter set identifier value for the second adaptation parameter set and the adaptation parameter set identifier value for the first adaptation parameter set are a same value.

Example 134

The method of any one of examples 132 to 133, wherein the first adaptation parameter set type value is an adaptive loop filter luma type, and wherein the second adaptation parameter set type value is an adaptive loop filter chroma type.

Example 135

The method of any one of examples 127 to 134, wherein the processor is configured to: set a value for at least one flag associated with the first adaptation parameter set, the at least one flag including at least one or more of a first flag indicating luma filter data is included in the first adaptation parameter set or a second flag indicating chroma filter data is included in the first adaptation parameter set.

Example 136

The method of example 135, wherein a value of the first flag and a value of the second flag are set independently.

Example 137

The method of any one of examples 127 to 136, wherein the first adaptation parameter set is uniquely identified by a combination of the adaptation parameter set type value and the adaptation parameter set identifier value as represented by a series of consecutive bits in the bitstream.

Example 138

The method of example 137, wherein a first portion of bits in the series of consecutive bits in the bitstream represents the adaptation parameter set type value and a second portion of bits in the series of consecutive bits in the bitstream represents the adaptation parameter set type identifier values.

Example 139

The method of example 137, wherein a first portion of bits in the series of consecutive bits in the bitstream represents the adaptation parameter set type identifier value, and wherein a second portion of bits following the first portion of bits in the bitstream represents the adaptation parameter set type value.

Example 140

The method of any one of examples 127 to 139, wherein the first adaptation parameter set includes luma filter coefficients and chroma filter coefficients, wherein the luma filter coefficients are associated with a second adaptation parameter set type value, and wherein the chroma filter coefficients are associated with a third adaptation parameter set type value different than the second adaptation parameter set type value.

Example 141

The method of example 140, wherein the luma filter coefficients are associated with a luma filter signaled flag, and wherein the chroma filter coefficients are associated with a chroma filter signaled flag different than and operates independently from the luma filter signaled flag.

What is claimed is:
1. An apparatus for decoding video data, the apparatus comprising:
   a memory; and
   a processor implemented in circuitry and configured to:
      obtain, from a bitstream, an adaptation parameter set identifier value associated with an adaptation parameter set network abstraction layer unit;
      obtain, from the bitstream, an adaptation parameter set type value associated with the adaptation parameter set network abstraction layer unit;

identify, from an adaptation parameter set syntax structure based on the adaptation parameter set type value, an adaptive loop filter data syntax structure for a first adaptation parameter set associated with at least a portion of at least one picture;

identify, from the adaptive loop filter data syntax structure, a first flag indicating whether a luma filter is signaled in the first adaptation parameter set;

identify, from the adaptive loop filter data syntax structure, a second flag indicating whether a chroma filter is signaled in the first adaptation parameter set; and reconstruct the portion of the at least one picture using parameters defined by at least one of the luma filter and the chroma filter.

2. The apparatus of claim 1, wherein a maximum number of adaptation parameter set identifiers that can use a particular adaptation parameter set type is defined by the adaptation parameter set type value.

3. The apparatus of claim 2, wherein a first adaptation parameter set type of a plurality of adaptation parameter set types is associated with a first number of identifier values, and wherein a second adaptation parameter set type of the plurality of adaptation parameter set types is associated with a second number of identifier values, the second number of identifier values being different than the first number of identifier values.

4. The apparatus of claim 2, wherein the maximum number of adaptation parameter set identifiers is a same value for each adaptation parameter set type.

5. The apparatus of claim 2, wherein a different number of bits are used for different types of adaptation parameter set identifiers.

6. The apparatus of claim 1, wherein the processor is configured to:
determine a second adaptation parameter set identifier value associated with a second adaptation parameter set network abstraction layer unit of the bitstream;
determine a second adaptation parameter set type value associated with the second adaptation parameter set network abstraction layer unit of the bitstream;
identify a second adaptation parameter set associated with at least a second portion of the at least one picture, the second adaptation parameter set being uniquely identified by the second adaptation parameter set type value and the second adaptation parameter set identifier value, wherein the adaptation parameter set identifier value range of the second adaptation parameter set is based on the second adaptation parameter set type value; and
reconstruct at least the second portion of the at least one picture of the bitstream using the adaptive loop filter with parameters defined by the second adaptation parameter set uniquely identified by the second adaptation parameter set type value and the second adaptation parameter set identifier value.

7. The apparatus of claim 6, wherein the adaptation parameter set identifier value for the second adaptation parameter set and the adaptation parameter set identifier value for the first adaptation parameter set are a same value.

8. The apparatus of claim 7, wherein the adaptation parameter set type value is an adaptive loop filter luma type, and wherein the second adaptation parameter set type value is an adaptive loop filter chroma type.

9. The apparatus of claim 1, wherein the first adaptation parameter set is uniquely identified by a combination of the adaptation parameter set type value and the adaptation parameter set identifier value, wherein the adaptation parameter set identifier value of the first adaptation parameter set is in a range based on the adaptation parameter set type value.

10. The apparatus of claim 1, wherein a value of the first flag and a value of the second flag are set independently.

11. The apparatus of claim 1, wherein the processor is configured to:
configure a first adaptation parameter set buffer for a first adaptation parameter set type; and
configure a second adaptation parameter set buffer for a second adaptation parameter set type, wherein the second adaptation parameter set buffer is physically separate from the first adaptation parameter set buffer.

12. The apparatus of claim 11, wherein the processor is configured to:
store received bits of the first adaptation parameter set having the first adaptation parameter set type in the first adaptation parameter set buffer; and
store received bits of a second adaptation parameter set having the second adaptation parameter set type in the second adaptation parameter set buffer.

13. The apparatus of claim 1, wherein the processor is configured to:
configure a first buffer for a first adaptation parameter set type of a plurality of adaptation parameter set types, the first buffer having a first identifier set range smaller than a maximum identifier value.

14. The apparatus of claim 13, wherein the processor is configured to:
configure a second buffer for a second adaptation parameter set type of the plurality of adaptation parameter set types, the second buffer having a second identifier set range smaller than the maximum identifier value, wherein the second identifier set range is different than the first identifier set range.

15. The apparatus of claim 1, wherein the processor is configured to:
interpret the adaptation parameter set identifier value using the adaptation parameter set type value.

16. The apparatus of claim 9, wherein the first adaptation parameter set is uniquely identified by the combination of the adaptation parameter set type value and the adaptation parameter set identifier value as represented by a series of consecutive bits in the bitstream.

17. The apparatus of claim 16, wherein a first portion of bits in the series of consecutive bits in the bitstream represents the adaptation parameter set type value and a second portion of bits in the series of consecutive bits in the bitstream represents the adaptation parameter set type identifier value.

18. The apparatus of claim 16, wherein a first portion of bits in the series of consecutive bits in the bitstream represents the adaptation parameter set type identifier value, and wherein a second portion of bits following the first portion of bits in the bitstream represents the adaptation parameter set type value.

19. The apparatus of claim 1, wherein the first adaptation parameter set includes luma filter coefficients and chroma filter coefficients, wherein the luma filter coefficients are associated with a second adaptation parameter set type value, and wherein the chroma filter coefficients are associated with a third adaptation parameter set type value different than the second adaptation parameter set type value.

20. The apparatus of claim 19, wherein the luma filter coefficients are associated with the first flag, and wherein the chroma filter coefficients are associated with the second flag, the second flag being different than and operating independently from the first flag.

21. The apparatus of claim 1, wherein the apparatus comprises a mobile device with a display configured to display the at least one picture.

22. The apparatus of claim 1, further comprising a display coupled to the processor, the display configured to display the at least one picture.

23. A method of decoding video data, the method comprising:
obtaining, from a bitstream, an adaptation parameter set identifier value associated with an adaptation parameter set network abstraction layer unit;
obtaining, from the bitstream, an adaptation parameter set type value associated with the adaptation parameter set network abstraction layer unit;
identifying, from an adaptation parameter set syntax structure based on the adaptation parameter set type value, an adaptive loop filter data syntax structure for a first adaptation parameter set associated with at least a portion of at least one picture;
identifying, from the adaptive loop filter data syntax structure, a first flag indicating whether a luma filter is signaled in the first adaptation parameter set;
identifying, from the adaptive loop filter data syntax structure, a second flag indicating whether a chroma filter is signaled in the first adaptation parameter set; and
reconstructing the portion of the at least one picture using parameters defined by at least one of the luma filter and the chroma filter.

24. The method of claim 23, wherein a maximum number of adaptation parameter set identifiers that can use a particular adaptation parameter set type is defined by the adaptation parameter set type value.

25. The method of claim 24, wherein a first adaptation parameter set type of a plurality of adaptation parameter set types is associated with a first number of identifier values, and wherein a second adaptation parameter set type of the plurality of adaptation parameter set types is associated with a second number of identifier values, the second number of identifier values being different than the first number of identifier values.

26. The method of claim 24, wherein the maximum number of adaptation parameter set identifiers is a same value for each adaptation parameter set type.

27. The method of claim 24, wherein a different number of bits are used for different types of adaptation parameter set identifiers.

28. The method of claim 23, further comprising:
determining a second adaptation parameter set identifier value associated with a second adaptation parameter set network abstraction layer unit of the bitstream;
determining a second adaptation parameter set type value associated with the second adaptation parameter set network abstraction layer unit of the bitstream;
identifying a second adaptation parameter set associated with at least a second portion of the at least one picture, the second adaptation parameter set being uniquely identified by the second adaptation parameter set type value and the second adaptation parameter set identifier value, wherein the adaptation parameter set identifier value range of the second adaptation parameter set is based on the second adaptation parameter set type value; and
reconstructing at least the second portion of the at least one picture of the bitstream using the adaptive loop filter with parameters defined by the second adaptation parameter set uniquely identified by the second adaptation parameter set type value and the second adaptation parameter set identifier value.

29. The method of claim 28, wherein the adaptation parameter set identifier value for the second adaptation parameter set and the adaptation parameter set identifier value for the first adaptation parameter set are a same value.

30. The method of claim 29, wherein the adaptation parameter set type value is an adaptive loop filter luma type, and wherein the second adaptation parameter set type value is an adaptive loop filter chroma type.

31. The method of claim 23, wherein the first adaptation parameter set is uniquely identified by a combination of the adaptation parameter set type value and the adaptation parameter set identifier value, wherein the adaptation parameter set identifier value of the first adaptation parameter set is in a range based on the adaptation parameter set type value.

32. The method of claim 23, wherein a value of the first flag and a value of the second flag are set independently.

33. An apparatus for encoding video data, the apparatus comprising:
a memory; and
a processor implemented in circuitry and configured to:
determine an adaptation parameter set identifier value associated with an adaptation parameter set network abstraction layer unit;
determine an adaptation parameter set type value associated with the adaptation parameter set network abstraction layer unit;
identify, based on the adaptation parameter set type value, an adaptive loop filter data syntax structure for a first adaptation parameter set associated with at least a portion of at least one picture;
generate, for the adaptive loop filter data syntax structure, a first flag indicating whether a luma filter is signaled in the first adaptation parameter set;
generate, for the adaptive loop filter data syntax structure, a second flag indicating whether a chroma filter is signaled in the first adaptation parameter set; and
generate a bitstream, the bitstream including the adaptation parameter set identifier value, the adaptation parameter set type value, the adaptive loop filter data syntax structure including the first flag and the second flag, and the at least portion of the at least one picture as encoded.

34. The apparatus of claim 33, wherein a maximum number of adaptation parameter set identifiers that can use a particular adaptation parameter set type is defined by the adaptation parameter set type value.

35. The apparatus of claim 34, wherein a first adaptation parameter set type of a plurality of adaptation parameter set types is associated with a first number of identifier values, and wherein a second adaptation parameter set type of the plurality of adaptation parameter set types is associated with a second number of identifier values, the second number of identifier values being different than the first number of identifier values.

36. The apparatus of claim 34, wherein the maximum number of adaptation parameter set identifiers is a same value for each adaptation parameter set type.

37. The apparatus of claim 34, wherein a different number of bits are used for different types of adaptation parameter set identifiers.

38. A method of encoding video data, the method comprising:

determining an adaptation parameter set identifier value associated with an adaptation parameter set network abstraction layer unit;

determining an adaptation parameter set type value associated with the adaptation parameter set network abstraction layer unit;

identifying, based on the adaptation parameter set type value, an adaptive loop filter data syntax structure for a first adaptation parameter set associated with at least a portion of at least one picture;

generating, for the adaptive loop filter data syntax structure, a first flag indicating whether a luma filter is signaled in the first adaptation parameter set;

generating, for the adaptive loop filter data syntax structure, a second flag indicating whether a chroma filter is signaled in the first adaptation parameter set; and generating a bitstream, the bitstream including the adaptation parameter set identifier value, the adaptation parameter set type value, the adaptive loop filter data syntax structure including the first flag and the second flag, and the at least portion of the at least one picture as encoded.

39. The method of claim 38, wherein a maximum number of adaptation parameter set identifiers that can use a particular adaptation parameter set type is defined by the adaptation parameter set type value.

40. The method of claim 39, wherein a first adaptation parameter set type of a plurality of adaptation parameter set types is associated with a first number of identifier values, and wherein a second adaptation parameter set type of the plurality of adaptation parameter set types is associated with a second number of identifier values, the second number of identifier values being different than the first number of identifier values.

41. The method of claim 39, wherein the maximum number of adaptation parameter set identifiers is a same value for each adaptation parameter set type.

42. The method of claim 39, wherein a different number of bits are used for different types of adaptation parameter set identifiers.

\* \* \* \* \*